(12) United States Patent
Miura

(10) Patent No.: US 9,285,096 B2
(45) Date of Patent: Mar. 15, 2016

(54) ILLUMINATION UNIT, PROJECTION DISPLAY UNIT, AND DIRECT-VIEW DISPLAY UNIT

(71) Applicant: Sony Corporation, Tokyo (JP)

(72) Inventor: Koji Miura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 304 days.

(21) Appl. No.: 13/893,823

(22) Filed: May 14, 2013

(65) Prior Publication Data

US 2013/0321780 A1   Dec. 5, 2013

(30) Foreign Application Priority Data

Jun. 4, 2012 (JP) ................... 2012-127017

(51) Int. Cl.
| | | |
|---|---|---|
| G03B 21/14 | (2006.01) | |
| G02B 27/09 | (2006.01) | |
| F21V 5/00 | (2015.01) | |
| G03B 21/20 | (2006.01) | |

(52) U.S. Cl.
CPC ............... *F21V 5/008* (2013.01); *G02B 27/09* (2013.01); *G03B 21/14* (2013.01); *G03B 21/2033* (2013.01)

(58) Field of Classification Search
CPC . G02B 27/09; G02B 27/0911; G02B 27/0961
USPC ........ 362/555, 561, 97.3, 230, 231, 235, 244, 362/249.02, 259, 268, 308, 309, 311.02, 362/311.06, 311.09, 311.1, 800; 349/61, 349/62; 353/38, 102
See application file for complete search history.

(56) References Cited

U.S. PATENT DOCUMENTS

| | | | |
|---|---|---|---|
| 6,773,142 B2* | 8/2004 | Rekow .......................... 362/259 |
| 7,016,393 B2* | 3/2006 | Anikitchev et al. ............ 372/101 |
| 7,410,264 B2* | 8/2008 | Yamasaki et al. ............... 353/94 |
| 2007/0273847 A1* | 11/2007 | Minami et al. ................. 353/101 |
| 2011/0188003 A1* | 8/2011 | Furutachi et al. ............... 353/34 |

FOREIGN PATENT DOCUMENTS

| | | |
|---|---|---|
| JP | 2010-048903 | 3/2010 |
| JP | 2011-128634 | 6/2011 |

* cited by examiner

*Primary Examiner* — William C Dowling
(74) *Attorney, Agent, or Firm* — Hazuki International, LLC

(57) ABSTRACT

An illumination unit includes: light sources each including a solid-state light-emitting device, the solid-state light-emitting device emitting light from a light emission region thereof, the light emission region including a plurality of light-emitting spots arranged along a predetermined direction; and an optical member, in which the optical member includes coupling lenses, the solid-state light-emitting device includes a single chip or a plurality of chips, the single chip or the plurality of chips in the solid-state light-emitting device having the plurality of light-emitting spots each include a laser diode, and a first coupling lens of the coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

18 Claims, 18 Drawing Sheets

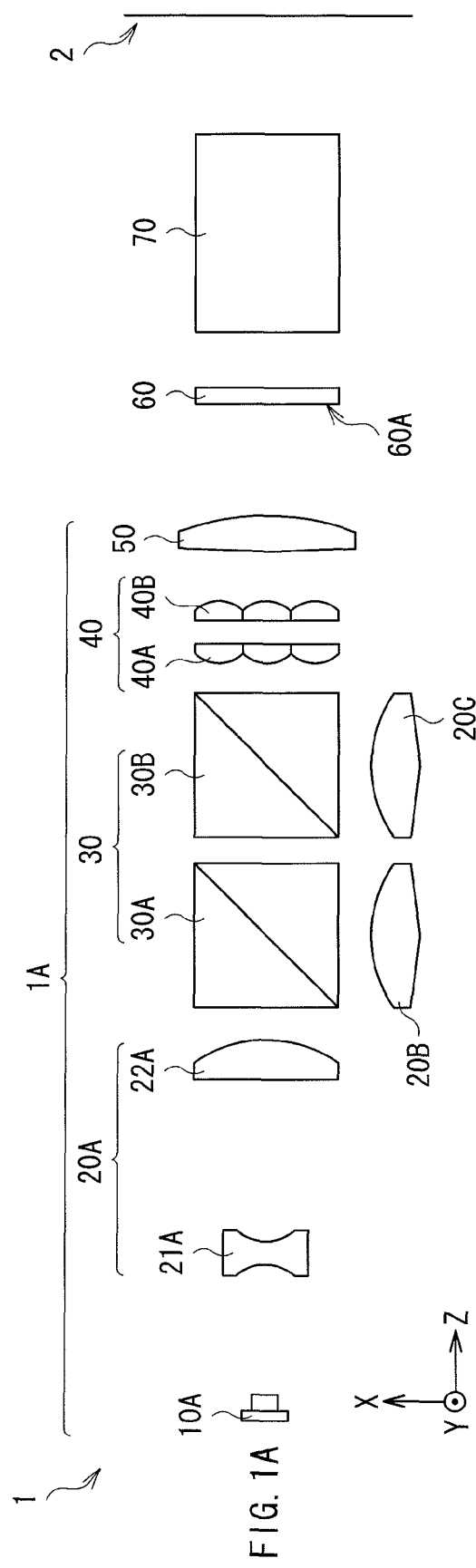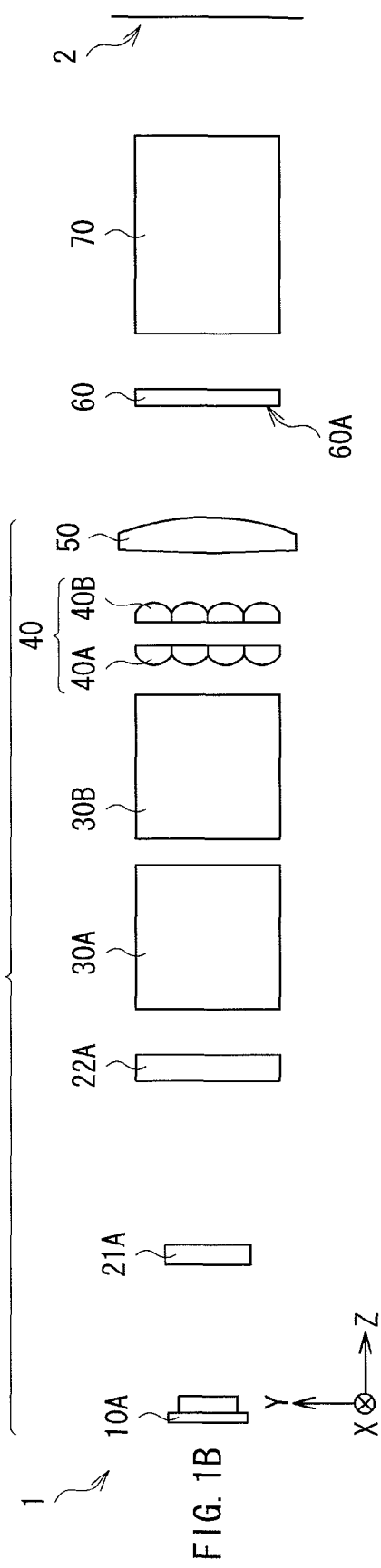
FIG. 1A
FIG. 1B

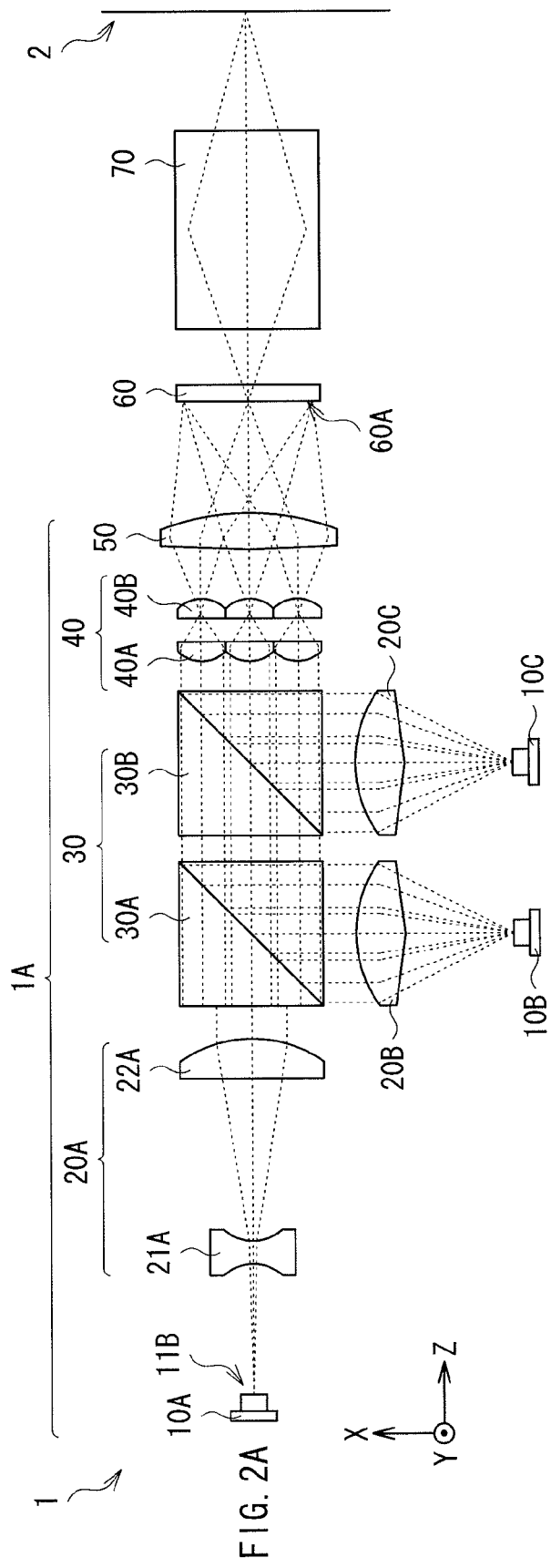
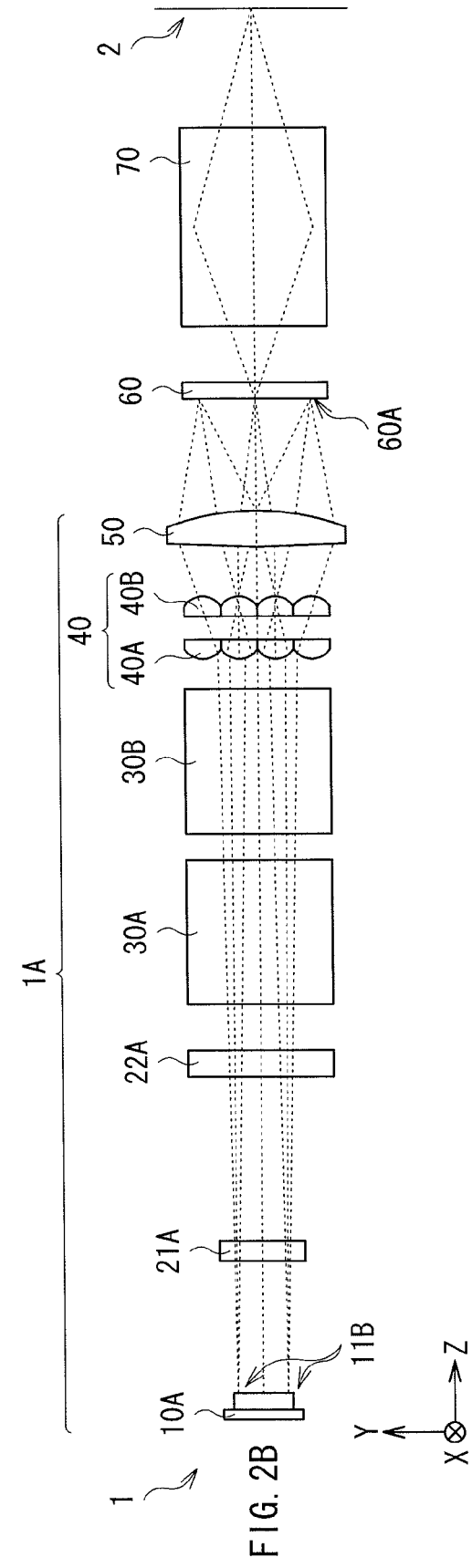

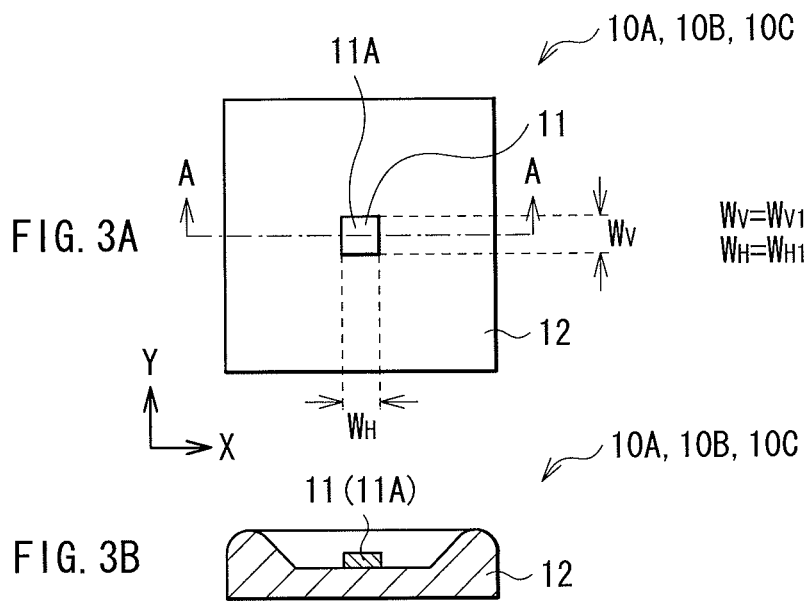
FIG. 3A
FIG. 3B
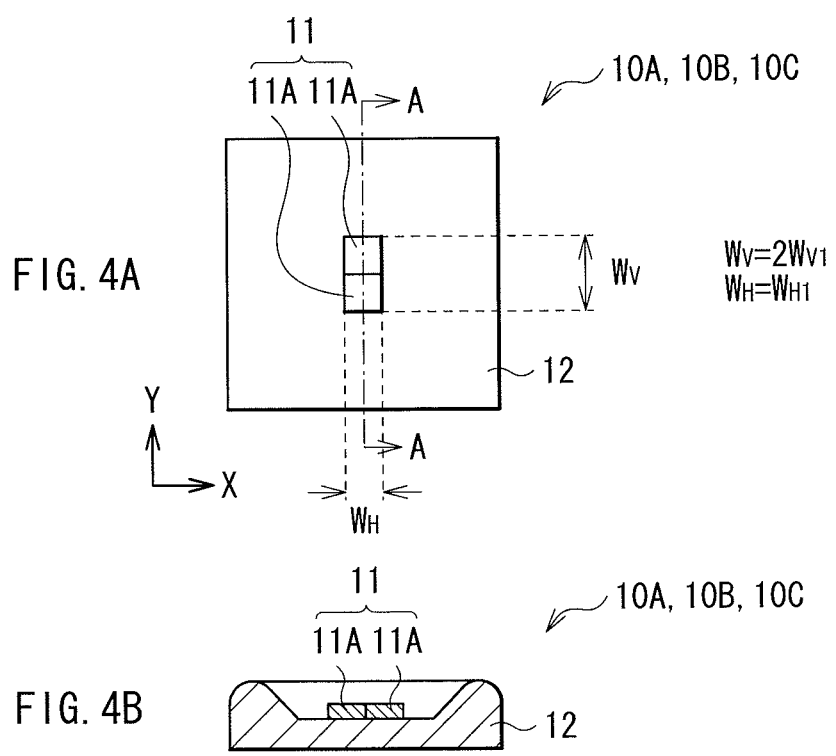
FIG. 4A
FIG. 4B

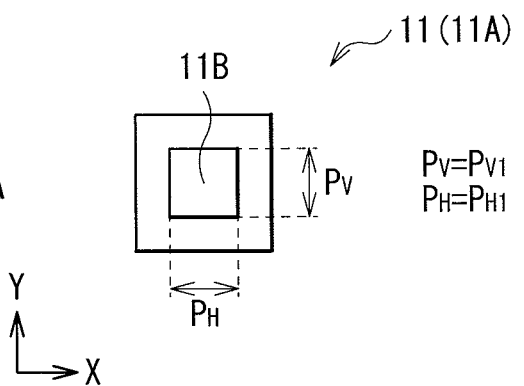
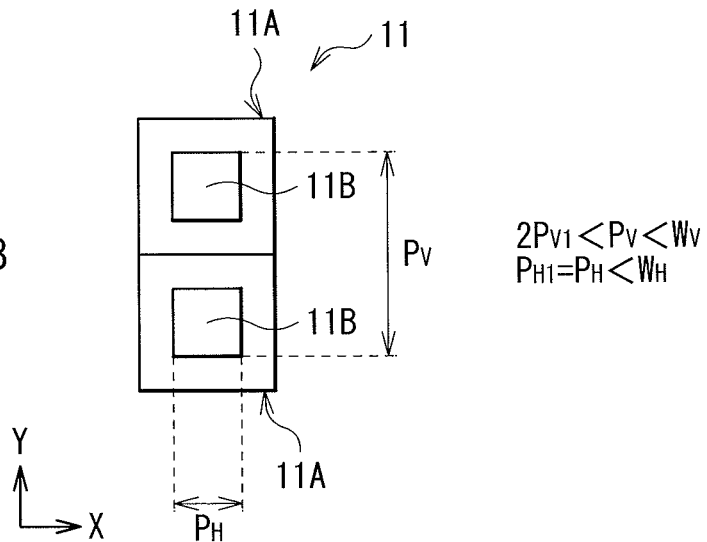
FIG. 5A
FIG. 5B $W_H = W_{H1}$
$W_V \geqq 3W_{V1}$

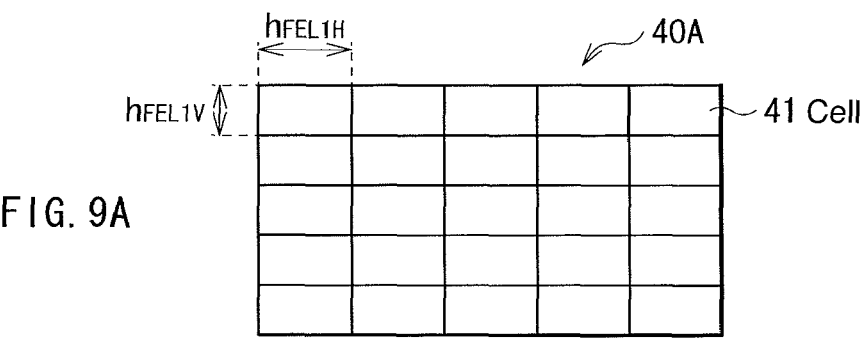
FIG. 9A
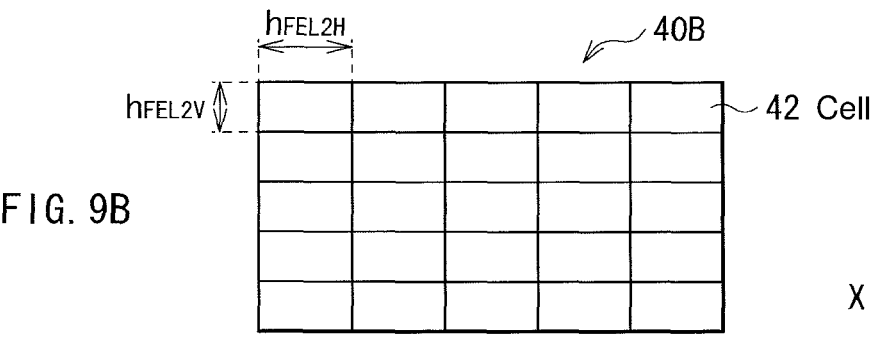
FIG. 9B
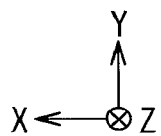

FIG. 13A  $\phi_{kx} > 4.3p$
(p=0.22, $\phi_{kx}$=0.95)
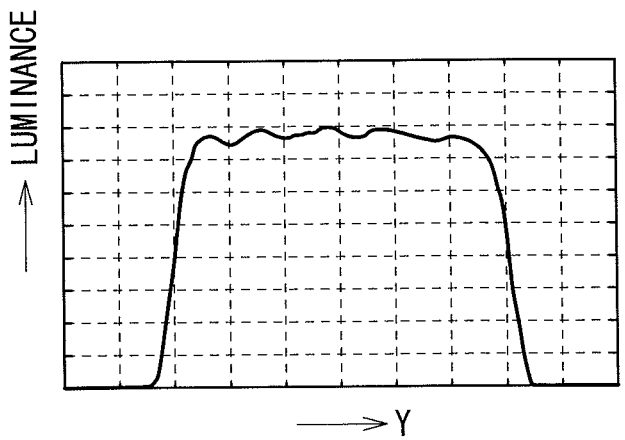
FIG. 13B  $\phi_{kx} > 2.3p$
(p=0.22, $\phi_{kx}$=0.49)
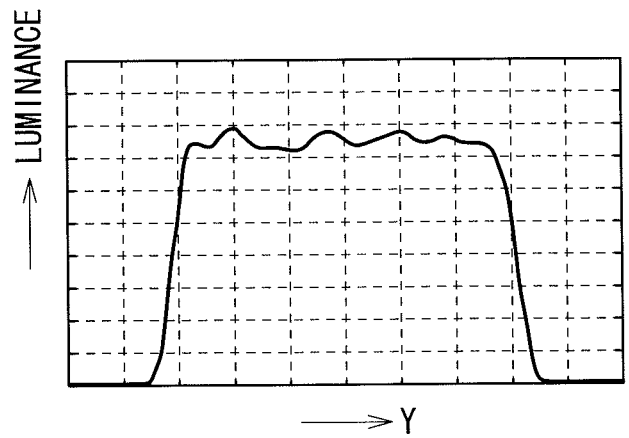
FIG. 13C  $\phi_{kx} > 1.6p$
(p=0.22, $\phi_{kx}$=0.35)
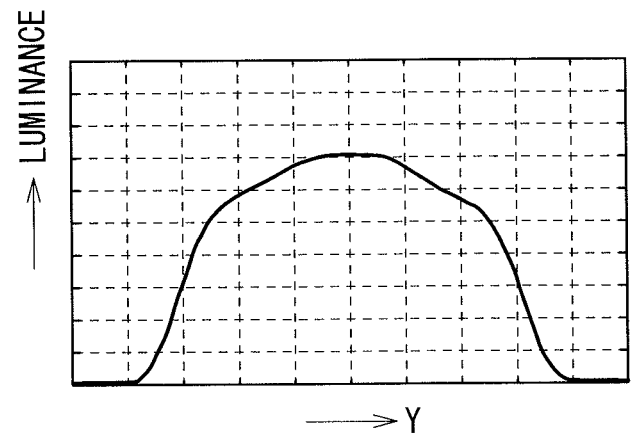

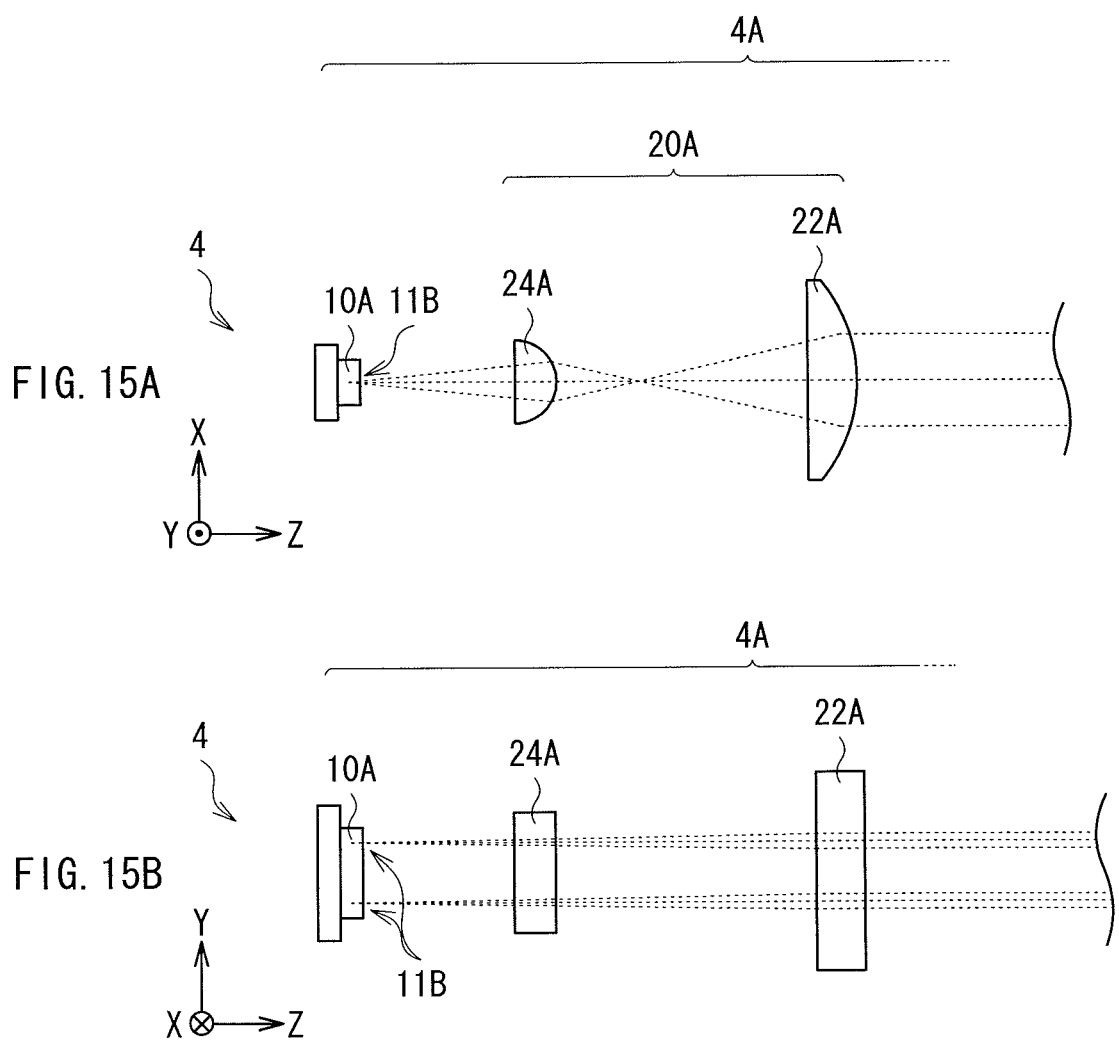

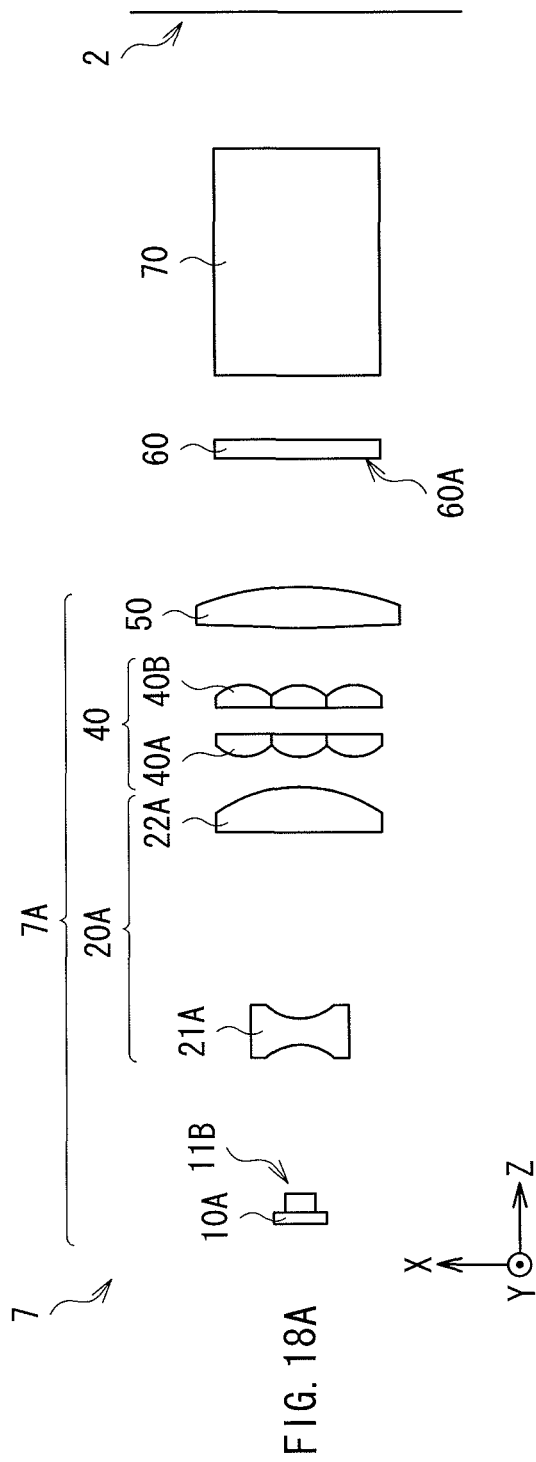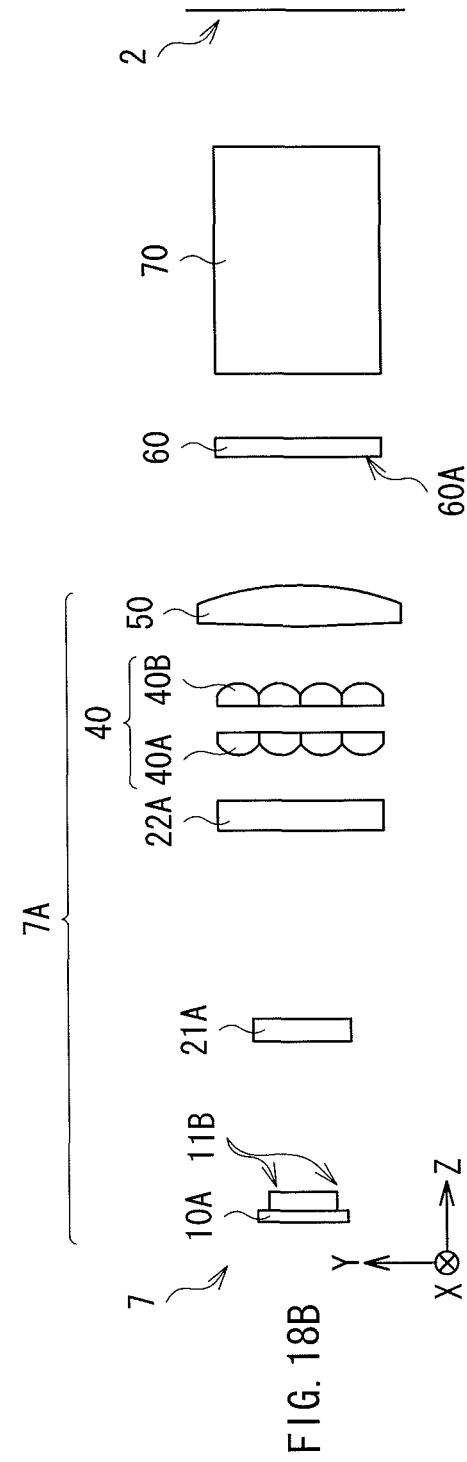
FIG. 18A
FIG. 18B

ILLUMINATION UNIT, PROJECTION DISPLAY UNIT, AND DIRECT-VIEW DISPLAY UNIT

CROSS REFERENCES TO RELATED APPLICATIONS

The present application claims priority to Japanese Priority Patent Application JP 2012-127017 filed in the Japan Patent Office on Jun. 4, 2012, the entire content of which is hereby incorporated by reference.

BACKGROUND

The present disclosure relates to an illumination unit using a solid-state light-emitting device such as a laser diode (LD), and a projection display unit and a direct-view display unit each of which includes the illumination unit.

In recent years, projectors projecting an image onto a screen are widely used not only in offices but also in households. A typical projector modulates light from a light source with use of a light valve to generate image light, and projects the image light onto a screen to thereby perform display (for example, refer to Japanese Unexamined Patent Application Publications No. 2011-128634 and 2010-48903). Recently, palm-sized ultra-compact projectors, cellular phones with a built-in ultra-compact projector, and the like are being introduced.

SUMMARY

High-intensity discharge lamps are dominant light sources used for projectors. However, since the discharge lamps have a relatively large size and high power consumption, in recent years, solid-state light-emitting devices such as light-emitting diodes (LEDs), laser diodes (LDs), and organic ELs (OLEDs) have been attracting attention as alternatives to the discharge lamps. These solid-state light-emitting devices have advantages over the discharge lamps not only in size and power consumption but also in high reliability. In particular, to achieve higher luminance and lower power consumption, it is effective to enhance light use efficiency with use of LDs which are point light sources.

Thus, in light sources (illumination units) for projectors and the like, in general, higher luminance of illumination light and an improvement in light use efficiency are desired, and it is desirable to achieve them with a simple (small) configuration.

It is desirable to provide a illumination unit capable of improving light use efficiency with a simple configuration while achieving higher luminance of illumination light, and a projection display unit and a direct-view display unit each of which uses such an illumination unit.

According to an embodiment of the disclosure, there is provided an illumination unit including: one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, in which the optical member includes one or more coupling lenses changing a directivity angle of the light incident from the solid-state light-emitting device, the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another, the single chip or the plurality of chips in the solid-state light-emitting device having the plurality of light-emitting spots each include a laser diode, and a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

According to an embodiment of the disclosure, there is provided a projection display unit provided with an illumination optical system, a spatial modulating device, and a projection optical system, the spatial modulating device modulating light from the illumination optical system based on an input image signal to generate image light, the projection optical system projecting the image light generated by the spatial modulating device, the illumination optical system including: one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, in which the optical member includes one or more coupling lenses changing a directivity angle of the light incident from the solid-state light-emitting device, the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another, the single chip or the plurality of chips in the solid-state light-emitting device having the plurality of light-emitting spots each include a laser diode, and a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

According to an embodiment of the disclosure, there is provided a direct-view display unit provided with an illumination optical system, a spatial modulating device, a projection optical system, and a transmissive screen, the spatial modulating device modulating light from the illumination optical system based on an input image signal to generate image light, the projection optical system projecting the image light generated by the spatial modulating device, the transmissive screen displaying the image light projected from the projection optical system, the illumination optical system including: one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, in which the optical member includes one or more coupling lenses changing a directivity angle of the light incident from the solid-state light-emitting device, the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another, the single chip or the plurality of chips in the solid-state light-emitting device having the plurality of light-emitting spots each include a laser diode, and a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

In the illumination unit, the projection display unit, and the direct-view display unit according to the embodiments of the disclosure, the single chip or the plurality of chips in the solid-state light-emitting device having the plurality of light-emitting spots each include a laser diode; therefore, higher luminance of illumination light is achieved. Moreover, since the coupling lens changing the directivity angle of light incident from the solid-state light-emitting device is provided as the optical member allowing light incident from the solid-state light-emitting device to pass therethrough and exit therefrom, use efficiency of light emitted from the light source is improved. Moreover, in the first coupling lens on which laser light emitted from the solid-state light-emitting device having the plurality of light-emitting spots is incident, the lens effect along the predetermined direction (the arrangement direction of the plurality of light-emitting spots) is smaller than the lens effect along the direction orthogonal to the above-described predetermined direction. Therefore, light use efficiency is improved while achieving simplification (downsizing) of a configuration.

In the illumination unit, the projection display unit, and the direct-view display unit according to the embodiments of the disclosure, the single chip or the plurality of chips in the solid-state light-emitting device having the plurality of light-emitting spots each include the laser diode, and the coupling lens changing the directivity angle of light incident from the solid-state light-emitting device is provided; therefore, light use efficiency is improvable while achieving higher luminance of illumination light. Moreover, in the first coupling lens on which the laser light emitted from the solid-state light-emitting device having the plurality of light-emitting spots is incident, the lens effect along the predetermined direction (the arrangement direction of the plurality of light-emitting spots) is smaller than the lens effect along the direction orthogonal to the above-described predetermined direction; therefore, light use efficiency is improvable while achieving simplification (downsizing) of the configuration. Thus, light use efficiency is improvable with a simple configuration while achieving higher luminance of illumination light, and display image quality is improvable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIGS. 1A and 1B are diagrams illustrating a schematic configuration of a projector according to an embodiment of the disclosure.

FIGS. 2A and 2B are diagrams illustrating an example of optical paths in the projector illustrated in FIGS. 1A and 1B.

FIGS. 3A and 3B are diagrams illustrating an example of a top configuration and a sectional configuration of the light source illustrated in FIGS. 1A and 1B in the case where a chip in the light source is of a top emission type.

FIGS. 4A and 4B are diagrams illustrating another example of the top configuration and the sectional configuration of the light source illustrated in FIGS. 1A and 1B in the case where the chip in the light source is of the top emission type.

FIGS. 5A and 5B are diagrams illustrating an example of a light-emitting spot in the light source illustrated in FIGS. 1A and 1B in the case where the chip in the light source is of the top emission type.

FIGS. 9A and 9B are diagrams illustrating schematic configurations of a fly-eye lens illustrated in FIGS. 1A and 1B.

FIGS. 13A to 13C are plots illustrating examples of a luminance distribution shape according to a ratio of an effective size in the fly-eye lens to the pitch of the cell.

FIGS. 15A and 15B are diagrams illustrating an example of a schematic configuration of an illumination optical system and optical paths according to Modification 2.

FIGS. 18A and 18B are diagrams illustrating a schematic configuration of a projector according to Modification 5.

DETAILED DESCRIPTION

Figure 6A:
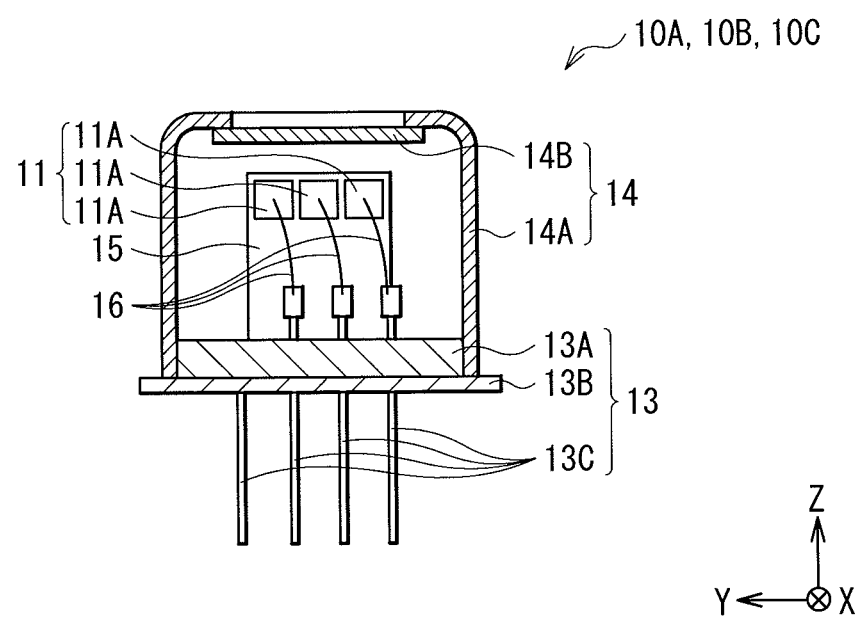
FIGS. 6A and 6B are diagrams illustrating an example of a sectional configuration of the light source illustrated in FIGS. 1A and 1B and a configuration of a solid-state light-emitting device when viewed from a light emission surface side thereof in the case where the chip in the light source is of an edge emission type.

Some embodiments of the present disclosure will be described in detail below referring to the accompanying drawings. It is to be noted that description will be given in the following order.

1. Embodiment (An example using two cylindrical lenses which are a concave lens and a convex lens)
2. Modifications of Embodiment
   Modification 1 (An example using a cylindrical lens and an anamorphic lens)
   Modification 2 (An example using two cylindrical lenses which are convex lenses)
   Modification 3 (An example using one cylindrical lens which is a convex lens)
   Modification 4 (An example in which only one light source is included in an illumination optical system)
   Modification 5 (An example using a reflective device as a spatial modulating device)
3. Other Modifications (Combinations of any of the embodiment, the modifications, and the like, an application example to a rear-projection display unit, and the like)

Embodiment

Entire Configuration of Projector 1

FIGS. 1A and 1B illustrate a schematic configuration of a projector (a projector 1) according to an embodiment of the disclosure. It is to be noted that the projector 1 corresponds to a specific example of "projection display unit" in an embodiment of the disclosure. FIG. 1A illustrates a configuration example of the projector 1 when viewed from above (from a y-axis direction), and FIG. 1B illustrates a configuration example of the projector 1 when viewed from a side thereof (from an x-axis direction). FIGS. 2A and 2B illustrate an example of optical paths in the projector 1 in FIGS. 1A and 1B. FIG. 2A illustrates an example of the optical paths when the projector 1 is viewed from above (from the y-axis direction), and FIG. 2B illustrates an example of the optical paths when the projector 1 is viewed from a side thereof (from the x-axis direction).

Typically, a y axis is directed toward a vertical direction, and an x axis is directed toward a horizontal direction; however, the y axis may be directed toward the horizontal direction, and the x axis may be directed toward the vertical direction. It is to be noted that, for convenience sake, in the following description, the y axis and the x axis are directed toward the vertical direction and the horizontal direction, respectively. Moreover, in the following description, a "transverse direction" indicates the x-axis direction, and a "longitudinal direction" indicates the y-axis direction.

The projector 1 may include, for example, an illumination optical system 1A, a spatial modulating device 60, and a projection optical system 70. The spatial modulating device 60 modulates light from the illumination optical system 1A based on an input image signal to generate image light, and the projection optical system 70 projects the image light generated by the spatial modulating device 60 onto a reflective screen 2. The illumination optical system 1A corresponds to a specific example of "illumination unit" in an embodiment of the disclosure.

Configuration of Illumination Optical System 1A

The illumination optical system 1A provides a light flux which is applied to an illumination region 60A (an illuminated surface) of the spatial modulating device 60. It is to be noted that, as necessary, any optical device may be included in a region where light of the illumination optical system 1A passes. For example, a filter which attenuates light, other than visible light, from the illumination optical system 1A, or the like may be included in the region where light of the illumination optical system 1A passes.

For example, as illustrated in FIGS. 1A and 1B, the illumination optical system 1A includes light sources 10A, 10B, and 10C, coupling lenses (directivity angle changing devices) 20A, 20B, and 20C, an optical path combining device 30, an integrator 40, and a condenser lens 50. The optical path combining device 30 combines light from the light sources 10A, 10B, and 10C, and may be configured of, for example, two dichroic mirrors 30A and 30B. The integrator 40 uniformizes an illuminance distribution (a luminance distribution) of light in the illumination region 60A, and may be configured of, for example, a pair of fly-eye lenses 40A and 40B. Alternatively, the integrator 40 may be configured of only one fly-eye lens. The coupling lens 20A, the optical path combining device 30, the integrator 40, and the condenser lens 50 are arranged in this order from a side closer to the light source 10A along an optical axis of the light source 10A. An optical axis of the light source 10B is orthogonal to the optical axis of the light source 10A on the dichroic mirror 30A, and the coupling lens 20B and the dichroic mirror 30A are arranged in this order from a side closer to the light source 10B along the optical axis of the light source 10B. An optical axis of the light source 10C is orthogonal to the optical axis of the light source 10A on the dichroic mirror 30B, and the coupling lens 20C and the dichroic mirror 30B are arranged in this order from a side closer to the light source 10C along the optical axis of the light source 10C.

The coupling lenses 20A, 20B, and 20C, and the integrator 40 from among the above-described components correspond to specific examples of "optical member (optical member allowing incident light from a solid-state light-emitting device which will be described later to pass therethrough and exit therefrom)" in an embodiment of the disclosure. Moreover, the coupling lens 20A corresponds to a specific example of "first coupling lens" in an embodiment of the disclosure.

It is to be noted that, in FIGS. 1A and 1B, the case where respective components (except for the light sources 10B and 10C and the coupling lenses 20B and 20C) of the projector 1 are arranged on a line segment parallel to a z axis is illustrated; however, some of the respective components of the projector 1 may be arranged on a line segment not parallel to the z axis. For example, although not illustrated, the entire illumination optical system 1A may be rotated by 90° from a state illustrated in FIGS. 1A and 1B to allow an optical axis of the illumination optical system 1A to be oriented toward a direction orthogonal to the z axis. However, in such a case, it is necessary to provide an optical device (for example, a mirror) guiding light output from the illumination optical system 1A toward the spatial modulating device 60. Moreover, for example, the light source 10A, the coupling lens 20A, and the optical path combining device 30 may be rotated by 90° from the state illustrated in FIGS. 1A and 1B to allow optical axes thereof to be oriented toward the direction orthogonal to the z axis. However, in such a case, it is necessary to provide an optical device (for example, a mirror) guiding light output from the optical path combining device 30 toward the integrator 40.

Light Sources 10A, 10B, 10C Including Chips 11A of Top Emission Type

For example, as illustrated in FIGS. 3A, 3B, 4A, and 4B, each of the light sources 10A, 10B, and 10C includes a solid-state light-emitting device 11 and a package 12 supporting the solid-state light-emitting device 11 (serving a base for mounting the solid-state light-emitting device 11 thereon). In other words, in this case, each of the light sources 10A, 10B, and 10C is formed in a manner of a package in which the solid-state light-emitting device 11 is supported on the base. The solid-state light-emitting device 11 emits light from a light emission region including one or more dot-shaped or non-dot-shaped light-emitting spots. For example, as illustrated in FIGS. 3A and 3B, the solid-state light-emitting device 11 may include a single chip 11A emitting light in a predetermined wavelength range, or as illustrated in FIGS. 4A and 4B, the solid-state light-emitting device 11 may include a plurality of chips 11A emitting light in a same wavelength range or light in wavelength ranges different from one another. In the case where the solid-state light-emitting device 11 includes a plurality of chips 11A, these chips 11A may be arranged, for example, in a line in the transverse direction or the longitudinal direction as illustrated in FIGS. 4A and 4B, or in a grid-like pattern in the transverse direction and the longitudinal direction. The number of chips 11A included in the solid-state light-emitting device 11 may be different in each of the light sources 10A, 10B, and 10C, or may be the same in all of the light sources 10A, 10B, and 10C.

In the case where the solid-state light-emitting device 11 includes the single chip 11A, for example, as illustrated in FIG. 3A, a size ($W_V \times W_H$) of the solid-state light-emitting device 11 is equal to a size ($W_{V1} \times W_{H1}$) of the single chip 11A. On the other hand, in the case where the solid-state light-emitting device 11 includes a plurality of chips 11A, for example, as illustrated in FIG. 4A, the size of the solid-state light-emitting device 11 is equal to the size of a package into which all of the chips 11A are gathered. In the case where the plurality of chips 11A are arranged in a line in the longitudinal direction, the size ($W_V \times W_H$) of the solid-state light-emitting device 11 is equal to $W_{H1} \times 2W_{V1}$ in an example in FIG. 4A. Moreover, in the case where the plurality of chips 11A are arranged in a grid-like pattern in the transverse direction and the longitudinal direction, the size ($W_V \times W_H$) of the solid-state light-emitting device 11 is equal to $2W_{V1} \times 2W_{H1}$.

Each of the chips 11A is configured of a light-emitting diode (LED), an organic EL light-emitting diode (OLED), or a laser diode (LD). However, in the embodiment, the chip(s) 11A included in one or two of the light sources 10A, 10B, and 10C may be configured of an LD. It is to be noted that the chip(s) 11A included in the other light source(s) may be configured of any of an LED, an OLED, and an LD.

The chips 11A included in the light sources 10A, 10B, and 10C emit light in wavelength ranges different in each of the light sources 10A, 10B, and 10C, for example. The chip 11A included in the light source 10A emits, for example, light in a wavelength of about 500 nm to about 600 nm both inclusive (green light). The chip 11A included in the light source 10B emits, for example, light in a wavelength of about 400 nm to about 500 nm both inclusive (blue light). The chip 11A included in the light source 10C emits, for example, light in a wavelength of about 600 nm to about 700 nm both inclusive (red light). It is to be noted that the chip 11A included in the light source 10A may emit light (blue light or red light) other than green light. Moreover, the chip 11A included in the light source 10B may emit light (green light or red light) other than blue light. Further, the chip 11A included in the light source 10C may emit light (green light or blue light) other than red light.

For example, as illustrated in FIGS. 3A and 3B to FIGS. 5A and 5B, each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In the case where the chip 11A is configured of an LED or an OLED, the light-emitting spot 11B has a non-dot (planar) shape, but in the case where the chip 11A is configured of an LD, the light-emitting spot 11B has a smaller dot shape than the light-emitting spot 11B of the LED or the OLED.

In the case where the solid-state light-emitting device 11 includes a single chip 11A, for example, as illustrated in FIG. 5A, the number of light-emitting spots 11B is one. However, as will be described later, in the case where the solid-state light-emitting device 11 has a monolithic configuration, the number of light-emitting spots 11B is two or more, and this applies to the following description. On the other hand, in the case where the solid-state light-emitting device 11 includes a plurality of chips 11A, for example, as illustrated in FIG. 5B, the number of the light-emitting spots 11B is equal to the number of chips 11A (however, as described above, the solid-state light-emitting device 11 has a monolithic configuration, the number of light-emitting spots 11B is larger than the number of chips 11A). In the case where the solid-state light-emitting device 11 includes the single chip 11A, a size ($P_V \times P_H$) of the light emission region of the solid-state light-emitting device 11 is equal to the size ($P_{V1} \times P_{H1}$) of the light-emitting spot 11B (except for the case where the solid-state light-emitting device 11 has a monolithic configuration, as described above). On the other hand, in the case where the solid-state light-emitting device 11 includes a plurality of chips 11A, the size ($P_V \times P_H$) of the light emission region of the solid-state light-emitting device 11 is equal to a size of a smallest possible enclosure containing the light-emitting spots 11B of all of the chips 11A. In the case where the plurality of chips 11A are arranged in a line in the longitudinal direction, in an example in FIG. 5B, the size ($P_V \times P_H$) of the light emission region is larger than $P_{H1} \times 2P_{V1}$, and is smaller than $W_V \times W_H$. Moreover, in the case where the plurality of chips 11A are arranged in a grid-like pattern in the transverse direction and the longitudinal direction, the size ($P_V \times P_H$) of the light emission region is larger than $2P_{V1} \times 2P_{H1}$, and is smaller than $W_V \times W_H$.

Light Sources 10A, 10B, and 10C Including Chips 11A of Edge-Emission Type

In FIGS. 3A and 3B to 5A and 5B, the case where the chips 11A are of a top-emission type is described as an example; however, the chips 11A may be of an edge-emission type which will be described later. In this case, for example, as illustrated in FIGS. 6A and 6B to 8A to 8C, the light sources 10A, 10B, and 10C each are of a can type in which the solid-state light-emitting device 11 including one or a plurality of edge-emission type chips 11A is contained in an inner space enclosed with a stem 13 and a cap 14. In other words, in this case, each of the light sources 10A, 10B, and 10C is formed in a manner of a package incorporating the solid-state light-emitting device 11.

The stem 13 configures, together with the cap 14, a package of each of the light sources 10A, 10B, and 10C, and includes, for example, a supporting substrate 13A supporting a submount 15, an outer frame substrate 13B disposed on a back side of the supporting substrate 13A, and a plurality of connection terminals 13C.

The submount 15 is made of a material having conductivity and thermal dissipation. The supporting substrate 13A and the outer frame substrate 13B each are configured of a base having conductivity and heat dissipation in which one or more insulating through holes and one or more conductive through holes are formed. The supporting substrate 13A and the outer frame substrate 13B each may have, for example, a disk shape, and are laminated to allow central axes (not illustrated) thereof to be superimposed on each other. A diameter of the outer frame substrate 13B is larger than that of the supporting substrate 13A. An outer edge of the outer frame substrate 13B is a ring-shaped flange hanging over in a radiation direction from the central axis of the outer frame substrate 13B in a plane having a normal along the central axis of the outer frame substrate 13B. The flange has a role in determining a reference position when the cap 14 is fit into the supporting substrate 13A in a manufacturing process.

The plurality of connection terminals 13C penetrate through at least the supporting substrate 13A. Terminals (hereinafter referred to as "terminals $\alpha$" for convenience sake) except for one or more terminals of the plurality of connection terminals 13C are electrically connected to respective electrodes (not illustrated) of the chips 11A. For example, the terminals $\alpha$ protrude long on the outer frame substrate 13B side, and protrude short on the supporting substrate 13A side. Moreover, a terminal (hereinafter referred to as "terminal $\beta$" for convenience sake) other than the above-described terminals $\alpha$ of the plurality of connection terminals 13C is electrically connected to the other electrodes (not illustrated) of all of the chips 11A. For example, the terminal $\beta$ protrudes long on the outer frame substrate 13B side, and, for example, an end located closer to the supporting substrate 13A of the terminal $\beta$ is embedded in the supporting substrate 13A. A portion protruding long on the outer frame substrate 13 side of each of the connection terminals 13C corresponds to a portion fit in, for example, a substrate or the like. On the other hand, portions protruding short on the supporting substrate 13A side of the plurality of connection terminals 13C correspond to portions electrically connected to the respective chips 11A through wires 16. Portions embedded in the supporting substrate 13A of the plurality of connection terminals 13C correspond to, for example, portions electrically connected to all of the chips 11A through the supporting substrate 13 and the submount 15. The terminals $\alpha$ are supported by the insulating through holes formed in the supporting substrate 13A and the outer frame substrate 13B, and are insulated and separated from the supporting substrate 13A and the outer frame substrate 13B by the through holes. Moreover, the terminals $\alpha$ are insulated and separated from one another by the above-described insulating members. On the other hand, the terminal $\beta$ is supported by the conductive through holes formed in the supporting substrate 13A and the outer frame substrate 13B, and is electrically connected to the through holes.

The cap 14 seals the solid-state light-emitting device 11. The cap 14 has, for example, a cylindrical section 14A having openings in upper and lower ends thereof. The lower end of the cylindrical section 14A is in contact with, for example, a side surface of the supporting substrate 13A, and the solid-state light-emitting device 11 is disposed in an inner space of the cylindrical section 14A. The cap 14 has a light transmission window 14B which is so disposed as to block the opening on the upper end of the cylindrical section 14A. The light transmission window 14B is disposed in a position facing a light emission surface of the solid-state light-emitting device 11, and has a function of allowing light output from the solid-state light-emitting device 11 to pass therethrough.

Thus, also in the case where the chip 11A is of an edge-emission type, the solid-state light-emitting device 11 emits light from the light emission region including one or more dot-shaped or non-dot-shaped light-emitting spots. The solid-state light-emitting device 11 may include, for example, a single chip 11A emitting light in a predetermined wavelength range, or a plurality of chips 11A emitting light in a same wavelength range or light in wavelength ranges different from one another. In the case where the solid-state light-emitting device 11 includes a plurality of chips 11A, for example, as illustrated in FIGS. 6A, 6B, 7A, and 7B, these chips 11A may be arranged in a line in the longitudinal direction, or may be arranged, for example, in a line in the transverse direction. The number of chips 11A included in the solid-state light-emitting device 11 may be different in each of the light sources 10A, 10B, and 10C, or may be the same in all of the light sources 10A, 10B, and 10C.

Figure 6B:
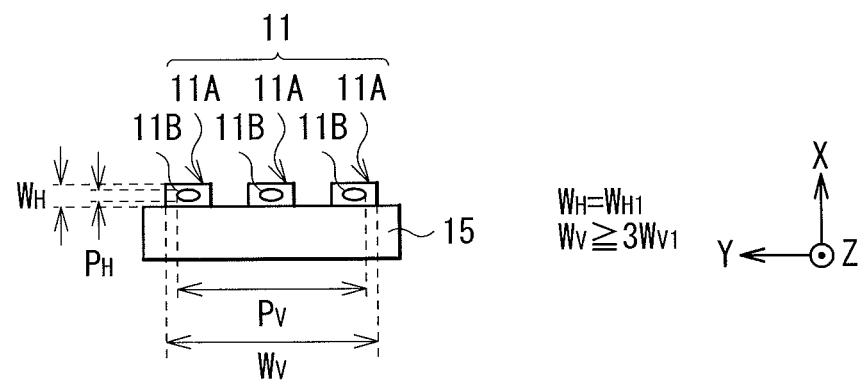
Figure 7A:
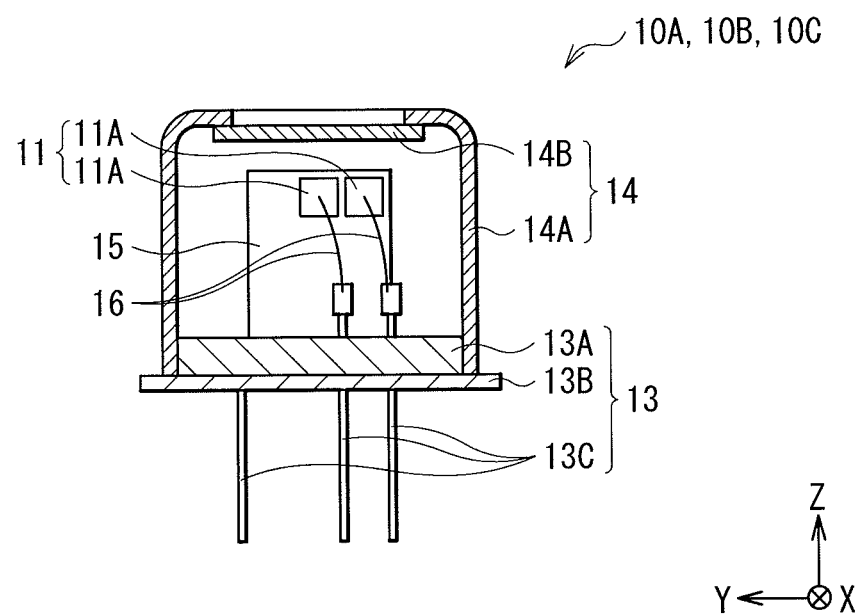
FIGS. 7A and 7B are diagrams illustrating another example of the sectional configuration of the light source illustrated in FIGS. 1A and 1B and the configuration of the solid-state light-emitting device when viewed from the light emission surface side thereof in the case where the chip in the light source is of the edge emission type.
Figure 7B:
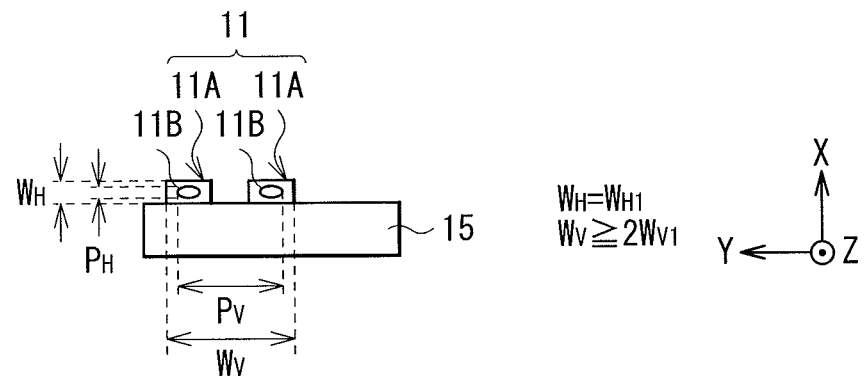
Figure 8A:
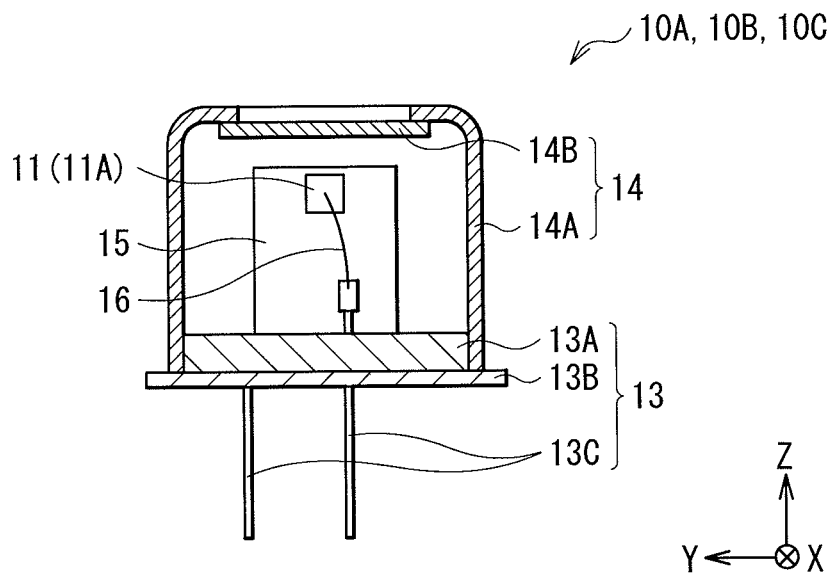
FIGS. 8A to 8C are diagrams illustrating still another example of the sectional configuration of the light source illustrated in FIGS. 1A and 1B and the configuration of the solid-state light-emitting device when viewed from the light emission surface side thereof in the case where the chip in the light source is of the edge emission type.
Figure 8B:
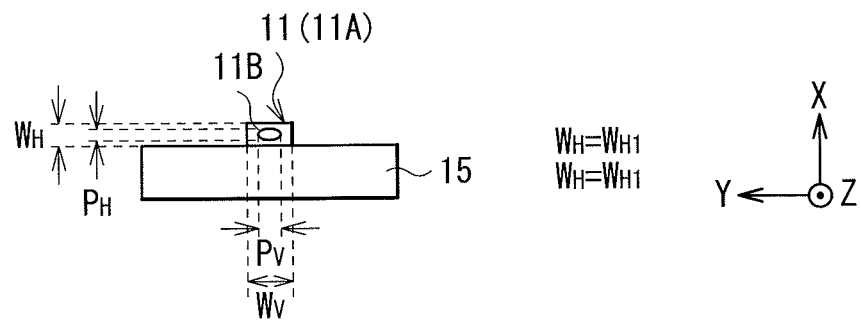
Figure 8C:
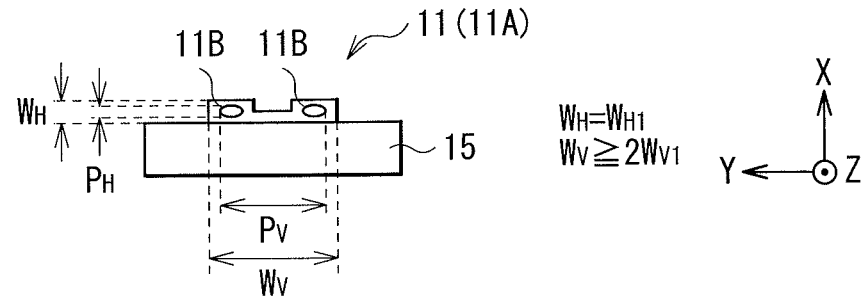

In the case where the solid-state light-emitting device 11 includes the single chip 11A, for example, as illustrated in FIG. 8B, the size ($W_V \times W_H$) of the solid-state light-emitting device 11 is equal to the size ($W_{V1} \times W_{H1}$) of the single chip 11A. However, for example, as illustrated in FIG. 8C, in the case where the solid-state light-emitting device 1 has a monolithic configuration, the size ($W_V \times W_H$) of the solid-state light-emitting device 11 is larger than $W_{H1} \times 2W_{V1}$, and this applies to the following description. On the other hand, in the case where the solid-state light-emitting device 11 includes a plurality of chips 11A, for example, as illustrated in FIGS. 6B and 7B, the size of the solid-state light-emitting device 11 is equal to the size of a package into which all of the chips 11A are gathered. In the case where the plurality of chips 11A are arranged in a line in the longitudinal direction, the size ($W_V \times W_H$) of the solid-state light-emitting device 11 is larger than $W_{H1} \times 3W_{V1}$ in an example in FIG. 6B, and is larger than $W_{H1} \times 2W_{V1}$ in an example in FIG. 7B. Moreover, in the case where the plurality of chips 11A are arranged in a line in the transverse direction, for example, the size ($W_V \times W_H$) of the solid-state light-emitting device 11 may be larger than $3W_{H1} \times W_{V1}$ or may be larger than $2W_{H1} \times W_{V1}$.

Each of the chips 11A may be configured of, for example, a laser diode (LD). However, also in this case, as described above, the chip(s) 11A included in one or two of the light sources 10A, 10B, and 10C may be configured of an LD. Moreover, the chip(s) 11A included in the other light source(s) may be configured of any of an LED, an OLED, and an LD.

For example, as illustrated in FIGS. 6A and 6B to 8A to 8C, each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In the case where the chip 11A is configured of an LD, the light-emitting spot 11B has a smaller dot shape than the light-emitting spot 11B of the LED or the OLED.

In the case where the solid-state light-emitting device 11 includes a single chip 11A, for example, as illustrated in FIG. 8B, the number of light-emitting spots 11B is one. However, for example, as illustrated in FIG. 8C, in the case where the solid-state light-emitting device 11 has a monolithic configuration, the number of light-emitting spots 11B is two or more (two in this case), and this applies to the following description. On the other hand, in the case where the solid-state light-emitting device 11 includes a plurality of chips 11A, for example, as illustrated in FIGS. 6B, 7B, and 8B, the number of the light-emitting spots 11B is equal to the number of chips 11A. In this case, in the case where the solid-state light-emitting device 11 includes the single chip 11A, the size ($P_V \times P_H$) of the light emission region of the solid-state light-emitting device 11 is equal to the size ($P_{V1} \times P_{H1}$) of the light-emitting spot 11B. However, for example, as illustrated in an example in FIG. 8C, in the case where the solid-state light-emitting device 11 has a monolithic configuration, the size ($P_V \times P_H$) of the light emission region of the solid-state light-emitting device 11 is larger than $P_{H1} \times 2P_{V1}$, and is smaller than $W_V \times W_H$, and this applies the following description. On the other hand, in the case where the solid-state light-emitting device 11 includes a plurality of chips 11A, the size ($P_V \times P_H$) of the light emission region of the solid-state light-emitting device 11 is equal to the size of a smallest possible enclosure containing the light-emitting spots 11B of all of the chips 11A. In the case where the plurality of chips 11A are arranged in a line in the longitudinal direction, in an example in FIG. 6B, the size ($P_V \times P_H$) of the light emission region is larger than $P_{H1} \times 3P_{V1}$, and is smaller than $W_V \times W_H$. Likewise, in an example in FIG. 7B, the size ($P_V \times P_H$) of the light emission region is larger than $P_{H1} \times 2P_{V1}$, and is smaller than $W_V \times W_H$. Moreover, in the case where the plurality of chips 11A are arranged in a line in the transverse direction, the size ($P_V \times P_H$) of the light emission region is larger than $3P_{H1} \times P_{V1}$, and is smaller than $W_V \times W_H$.

Coupling Lenses 20A, 20B, and 20C

For example, as illustrated in FIGS. 2A and 2B, the coupling lens 20A converts light emitted from the light source 10A into substantially parallel light, and changes a directivity angle of the light emitted from the light source 10A to be equal to or close to a directivity angle of parallel light. The coupling lens 20A is disposed in a position where light within the directivity angle of the light emitted from the light source 10A enters. For example, as illustrated in FIGS. 2A and 2B, the coupling lens 20B converts light emitted from the light source 10B into substantially parallel light, and changes a directivity angle of the light emitted from the light source 10B to be equal to or close to the directivity angle of parallel light. The coupling lens 20B is disposed in a position where light within the directivity angle of the light emitted from the light source 10B enters. For example, as illustrated in FIGS. 2A and 2B, the coupling lens 20C converts light emitted from the light source 10C into substantially parallel light, and changes a directivity angle of the light emitted from the light source 10C to be equal to or close to the directivity angle of parallel light. The coupling lens 20C is disposed in a position where light within the directivity angle of the light emitted from the light source 10C enters. In other words, the coupling lenses 20A, 20B, and 20C are disposed for the light sources 10A, 10B, and 10C, respectively (for respective packages). It is to be noted that each of the coupling lenses 20A, 20B, and 20C may be configured of a single lens, or a plurality of lenses.

Each of the dichroic mirrors 30A and 30B includes one mirror having wavelength selectivity. It is to be noted that, for example, the above-described mirror is formed through evaporating a multilayer interference film. For example, as illustrated in FIGS. 2A and 2B, the dichroic mirror 30A allows light incident from a back side of the mirror (light incident from the light source 10A) to pass toward a front side of the mirror, and reflects light incident from the front side of the mirror (light incident from the light source 10B) by the mirror. On the other hand, as illustrated in FIGS. 2A and 2B, the dichroic mirror 30B allows light incident from a back side of the mirror (light of the light sources 10A and 10B incident from the dichroic mirror 30A) to pass to a front side of the mirror, and reflects light incident from the front side of the mirror (light incident from the light source 10C) by the mirror. Therefore, the optical path combining device 30 combines respective light fluxes emitted from the light sources 10A, 10B, and 10C into a single light flux.

For example, as illustrated in FIGS. 9A and 9B, the fly-eye lenses 40A and 40B are configured of a plurality of cells 41 (unit cells) and a plurality of cells 42 (unit cells), respectively. The plurality of cells 41 and the plurality of cells 42 are a plurality of lenses arranged in a predetermined arrangement (in this case, a matrix of 5 (vertical)×5 (horizontal)). In other words, the cells 41 in the fly-eye lens 40A and the cells 42 in the fly-eye lens 40B are arranged along respective arrangement directions, that is, the transverse direction (the x-axis direction) and the longitudinal direction (the y-axis direction) orthogonal to each other. The respective cells 42 included in the fly-eye lens 40B are so arranged as to face the respective cells 41 of the fly-eye lens 40A. The fly-eye lens 40A is disposed in a focal position (or a substantial focal position) of the fly-eye lens 40B, and the fly-eye lens 40B is disposed in a focal position (or a substantial focal position) of the fly-eye lens 40A. Therefore, the integrator 40 allows light fluxes formed through separating the single light flux by the fly-eye lens 40A to be focused on proximity to a lens plane on an image side of the fly-eye lens 40B, thereby forming a secondary light source plane (a light source image) thereon. The secondary light source plane is located on a plane conjugate to an entrance pupil of the projection optical system 70. However, the secondary light source plane is not necessarily precisely located on the plane conjugate to the entrance pupil of the projection optical system 70, and may be located within a design allowable region. It is to be noted that the fly-eye lenses 40A and 40B may be integrally formed as one unit.

In general, each of light fluxes emitted from the light sources 10A, 10B, and 10C have a nonuniform intensity distribution (luminance distribution) on a plane perpendicular to a traveling direction thereof. Therefore, when these light fluxes are directly guided to the illumination region 60A (the illuminated surface), an illuminance distribution (a luminance distribution) in the illumination region 60A becomes nonuniform. On the other hand, as described above, when light fluxes emitted from the light sources 10A, 10B, and 10C are separated by the integrator 40 into a plurality of light fluxes, and the plurality of light fluxes are guided to the illumination region 60A in a superimposed manner, the illuminance distribution on the illumination region 60A is allowed to become uniform (nonuniformity of the illumination distribution is allowed to be reduced).

The condenser lens 50 condenses the light fluxes, from light sources, formed by the integrator 40 to illuminate the illumination region 60A with the light fluxes in a superimposed manner.

The spatial modulating device 60 two-dimensionally modulates light fluxes from the illumination optical system 1A based on color image signals corresponding to respective wavelength components of the light sources 10A, 10B, and 10C to generate image light. For example, as illustrated in FIGS. 2A and 2B, the spatial modulating device 60 is a transmissive device, and may be configured of, for example, a transmissive liquid crystal panel.

Configuration of Characteristic Part of Projector 1

Next, a characteristic part of the projector 1 according to the embodiment will be described below.

First, in the embodiment, the solid-state light-emitting device 11 having a light emission region which includes a plurality of light-emitting spots 11B arranged along a predetermined direction (in the longitudinal direction (the y-axis direction) in this case) is provided to one (in particular, the light source 10A in this case) or more of the light sources 10A, 10B, and 10C. More specifically, in this case, as illustrated in FIGS. 2A and 2B, the solid-state light-emitting device 11 in the light source 10A has two light-emitting spots 11B arranged along the y-axis direction. It is to be noted that, as described above, a plurality of light-emitting spots 11B may be provided by a plurality of chips 11A or by a single chip 11A with a monolithic configuration. In the solid-state light-emitting device 11 having such light-emitting spots 11B, the chip 11A includes an LD (a semiconductor laser or the like).

Moreover, in the embodiment, as described above, as optical members allowing light incident from the solid-state light-emitting device 11 to pass therethrough and exit therefrom, the coupling lenses 20A, 20B, and 20C changing a directivity angle of light incident from the solid-state light-emitting device 11 are provided. As described above, a coupling lens (the coupling lens 20A in this case) where laser light emitted from the solid-state light-emitting device 11 having a plurality of light-emitting spots 11B enters of the coupling lenses 20A, 20B, and 20C is so configured as to have a lens effect exhibiting the following function. In other words, for example, as illustrated in FIGS. 2A and 2B, the coupling lens is so configured as to have a smaller lens effect along the above-described predetermined direction (an arrangement direction of the plurality of light-emitting spots 11B; the y-axis direction) than a lens effect along a direction (the x-axis direction) orthogonal to the predetermined direction in the light emission region of the solid-state light-emitting device 11. It is to be noted that the lens effect in the coupling lens 20A in this case refers to divergent or convergent refractive power of a lens for being optically coupled with an optical system following the coupling lens (the optical path combining device 30, the integrator 40, and the like in this case).

In the embodiment, more specifically, to achieve such a lens effect, the coupling lens 20A has a lens configuration illustrated in FIGS. 1A, 1B, 2A, and 2B. In other words, the coupling lens 20A includes one or more cylindrical lenses not having a lens effect along the above-described arrangement direction (the y-axis direction) of the plurality of light-emitting spots. More specifically, in this case, the coupling lens 20A includes a cylindrical lens 21A (a first cylindrical lens) which is located closer to the light source 10A (in a preceding stage) and is a concave lens and a cylindrical lens 22A (a second cylindrical lens) which is located closer to the dichroic mirror 30A (in a following state) and is a convex lens. For example, as illustrated in FIGS. 2A and 2B, the cylindrical lens 21A is a lens having a function of expanding a diameter of incident laser light (a light flux diameter). On the other hand, the cylindrical lens 22A is a lens having a function of converting laser light with a diameter expanded by the cylindrical lens 21A into a substantially parallel light beam in a plane (a z-x plane) orthogonal to the arrangement direction of the light-emitting spots 11B and then emitting the substantially parallel light beam. With such a configuration, the entire coupling lens 20A changes a directivity angle of incident laser light to convert the laser light into a substantially parallel light beam in the plane (the z-x plane) orthogonal to the arrangement direction of the light-emitting spots 11B and then to emit the substantially parallel light beam.

It is to be noted that, unlike the coupling lens 20A with such a configuration, each of the coupling lenses 20B and 20C is configured of one spherical lens which is a convex lens.

Functions and Effects of Projector 1

Next, functions and effects of the projector 1 according to the embodiment will be described below.

First, in the embodiment, the solid-state light-emitting device 11 having a light emission region which includes a plurality of light-emitting spots 11B arranged along the predetermined direction (the y-axis direction) is included in the light source 10A. In the solid-state light-emitting device 11 having the plurality of light-emitting spots 11B, the chip 11A includes an LD. Therefore, output of laser light is increased with a simple configuration, and higher luminance of illumination light is achieved. In other words, to achieve an increase in output of laser light with a single light-emission spot 11B, for example, it is necessary to increase light emission efficiency of a semiconductor or light extraction efficiency; therefore, it is technically highly difficult. On the other hand, when a plurality of light-emitting spots 11B are used in combination, an increase in output of laser light is achieved with a simple configuration.

Moreover, in the embodiment, as optical members allowing light incident from the solid-state light-emitting device 11 to pass therethrough and exit therefrom, the coupling lenses 20A, 20B, and 20C changing the directivity angle of light incident from the solid-state light-emitting device 11 are provided. Therefore, use efficiency (light use efficiency) of light emitted from the light sources 10A, 10B, and 10C is improved.

Function of Coupling Lens 20A

Moreover, in the embodiment, the coupling lens 20A where laser light emitted from the solid-state light-emitting device 11 having a plurality of light-emitting spots 11B enters is so configured as to have a lens effect exhibiting the following lens function. In other words, for example, as illustrated in FIGS. 2A and 2B, the coupling lens 20A is so configured as to have a smaller lens effect along the above-described predetermined direction (an arrangement direction of the plurality of light-emitting spots 11B; the y-axis direction) than a lens effect along the direction (the x-axis direction) orthogonal to the predetermined direction in the light emission region of the solid-state light-emitting device 11. Thus, it is only necessary for the coupling lens 20A to have a relatively small lens effect along the arrangement direction of the plurality of light-emitting spots 11B (it is not necessary to produce the lens effect in this case); therefore, light use efficiency is improved while achieving simplification (downsizing) of a configuration of an optical member (the coupling lens 20A).

More specifically, for example, it is not necessary to separately provide a cylindrical lens along the arrangement direction of the plurality of light-emitting spots 11B and a cylindrical lens along the direction orthogonal to the arrangement direction; therefore, simplification (downsizing) of the configuration of the coupling lens 20A is achievable. Moreover, when light is allowed to enter the integrator 40, for example, with an LD having an extremely small divergent angle, it is necessary for an optical system to have an optical path long enough to make a light flux sufficiently large on the integrator 40, and the optical system becomes extremely large accordingly. On the other hand, in the embodiment, since the coupling lens 20A with the above-described configuration is used, it is not necessary for the optical system to have an optical path long enough to make the light flux incident on the integrator 40 sufficiently large; therefore, downsizing is easily achieved.

Function of Integrator 40

Figure 10:
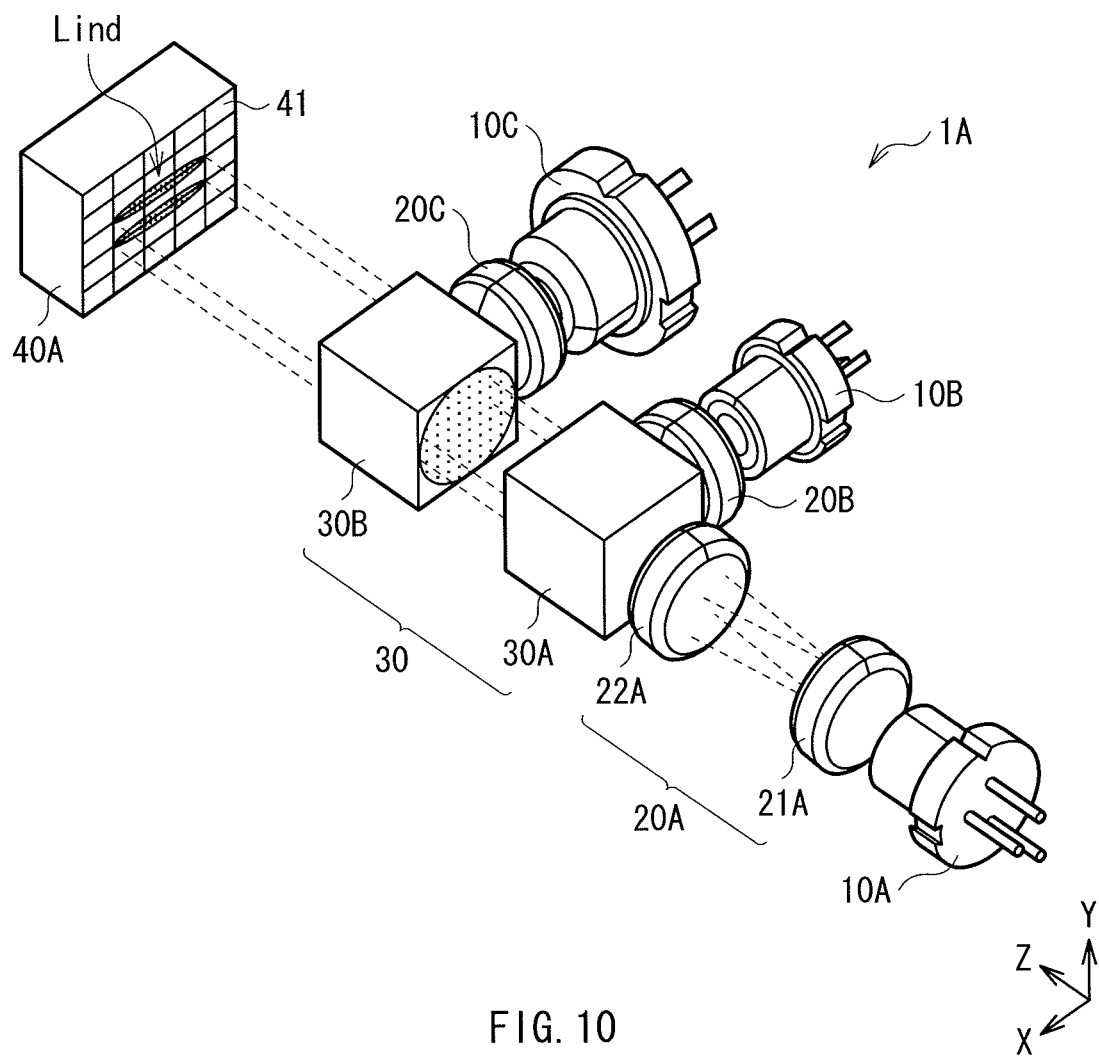
FIG. 10 is a perspective view illustrating an example of optical paths in an illumination optical system illustrated in FIGS. 1A and 1B.
Figure 11:
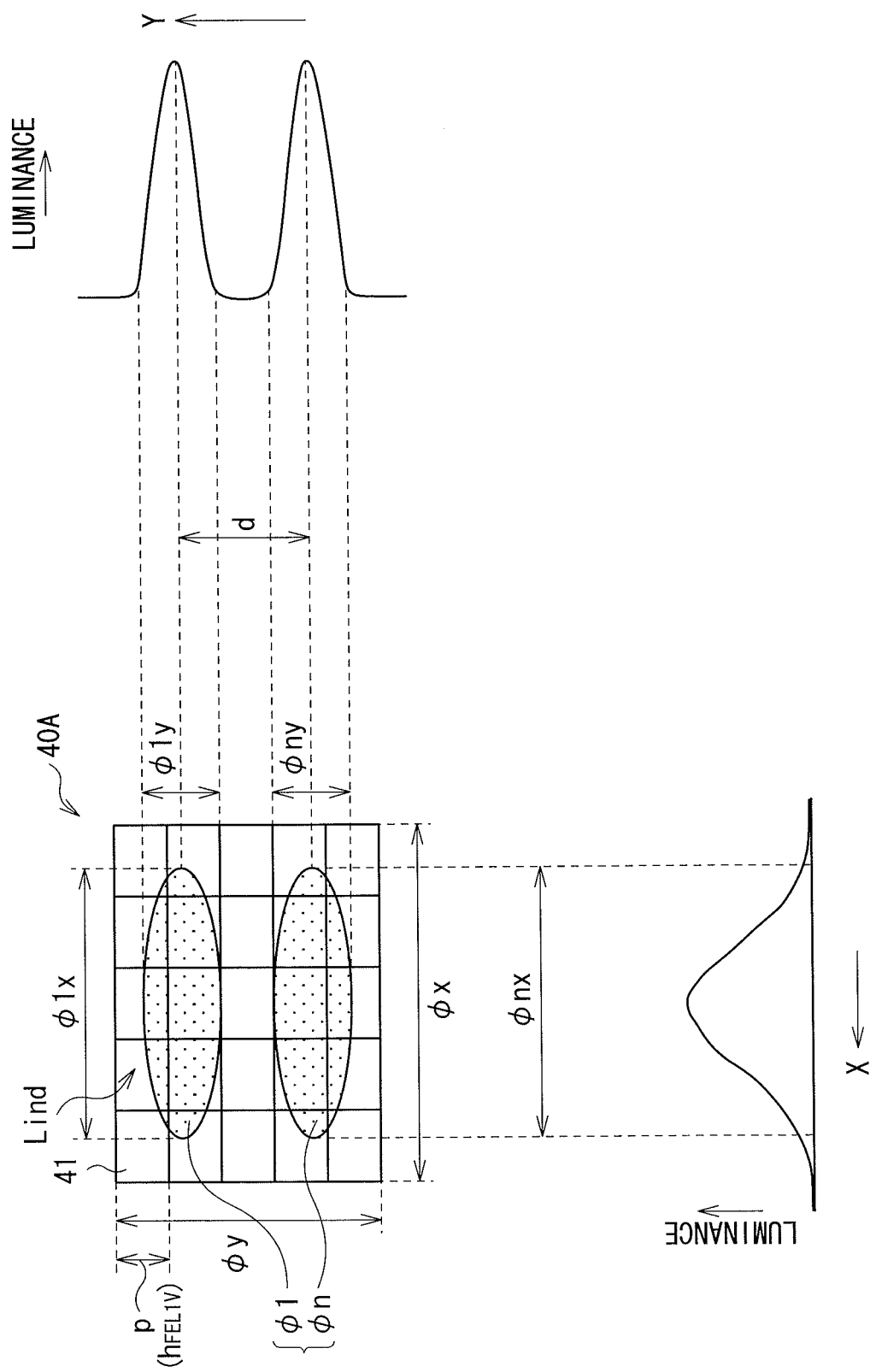
FIG. 11 is a schematic view illustrating a luminance distribution example of incident light on a fly-eye lens located in a preceding stage illustrated in FIGS. 1A and 1B.

Moreover, at this time, in the embodiment, for example, as illustrated in FIGS. 10 and 11, luminance distribution regions with the following shape are formed on a light incident plane of the integrator 40 (the fly-eye lens 40A) by light fluxes incident from the coupling lens 20A. In other words, a plurality of luminance distribution regions Lind corresponding to respective light-emitting spots 11B are separately formed along the arrangement direction (the y-axis direction) of the plurality of light-emitting spots 11B. More specifically, in this case, each of the luminance distribution regions Lind has an anisotropic shape having a minor-axis direction along the arrangement direction (the y-axis direction) of the plurality of light-emitting spots 11B and a major-axis direction along the direction (the x-axis direction) orthogonal to the arrangement direction by anisotropy of the lens effect in the above-described coupling lens 20A.

In this case, in the integrator 40 in the embodiment, for example, as illustrated in FIG. 11, the following expressions (1) and (2) are preferably satisfied in relation to sizes of light fluxes forming the respective luminance distribution regions Lind and an effective size in the light incident plane of the fly-eye lens 40A. It is to be noted that, in this case, a light flux size is determined by a length of a luminance region with intensity (luminance) of ($1/e^2$) or over in an incident light flux onto the fly-eye lens 40A. When these expressions (1) and (2) are satisfied, laser light emitted from the plurality of light-emitting spots 11B in the light source 10A is allowed to reach the integrator 40 (the fly-eye lens 40A) without causing light loss, thereby further improving light use efficiency. Moreover, for example, in the case where a divergent angle (a beam spread angle along the y-axis direction) of the light source 10A itself falls in an allowable angle of the integrator 40, light is allowed to be guided to the illumination region 60A without causing light loss.

$$\phi x \geq \phi kx \quad (1)$$

$$\phi y \geq (\phi ly/2) + (\phi ny/2) + d \quad (2)$$

where φx is an effective size of the integrator 40 along the direction (the x-axis direction) orthogonal to the arrangement direction of the plurality of light-emitting spots 11B on the above-described light incident plane, φy is an effective size of the integrator 40 along the arrangement direction (the y-axis direction) of the plurality of light-emitting spots 11B on the above-described light incident plane, φk is each of light fluxes forming the plurality of luminance distribution regions Lind, where k=1, 2, . . . , or n, and n is an integer of 2 or more, φkx is a light flux size along the direction (the x-axis direction) orthogonal to the arrangement direction of the plurality of light-emitting spots 11B of the light flux φk, φly is a light flux size along the arrangement direction (the y-axis direction) of the plurality of light-emitting spots 11B in the light flux φl, φny is a light flux size along the arrangement direction (the y-axis direction) of the plurality of light-emitting spots 11B in the light flux φn, and d is a distance between centers of the light fluxes φl and φn along the arrangement direction (y-axis direction) of the plurality of light-emitting spot 11B.

In the case where the above-described expressions (1) and (2) are satisfied, light use efficiency has, for example, about 90% or over. At this time, in particular, the light flux size φkx preferably satisfies the following expressions (3) and (4) or the following expressions (5) and (6). When the expressions (3) and (4) are satisfied, light use efficiency from the light source 10A to the integrator 40 is, for example, higher than about 97%. Moreover, when the expressions (5) and (6) are satisfied, the light use efficiency from the light source 10A to the integrator 40 is, for example, close to about 100%. In other words, a further improvement in light use efficiency is achieved.

$$0.77\phi x > \phi kx \quad (3)$$

$$0.77\phi y > (\phi ly/2) + (\phi ny/2) + d \quad (4)$$

$$0.52\phi x > \phi kx \quad (5)$$

$$0.52\phi y > (\phi ly/2) + (\phi ny/2) + d \quad (6)$$

Figure 12A:
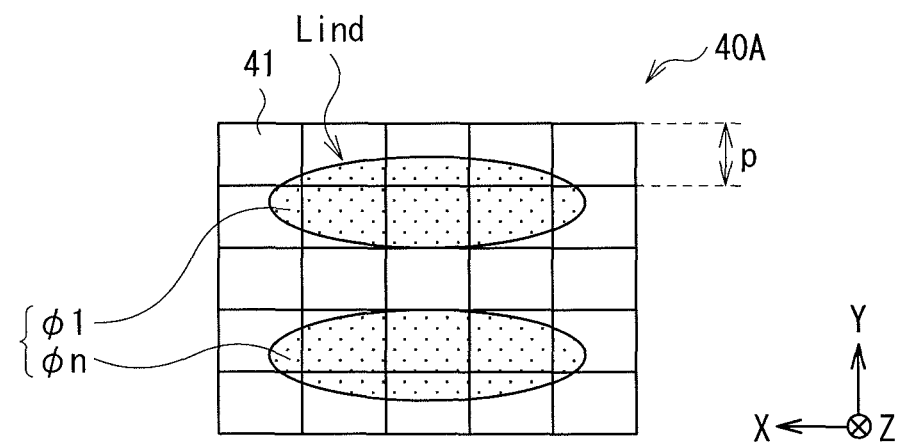
FIGS. 12A and 12B are schematic views illustrating examples of a relationship between a luminance distribution region illustrated in FIG. 11 and a pitch of a cell in the fly-eye lens.
Figure 12B:
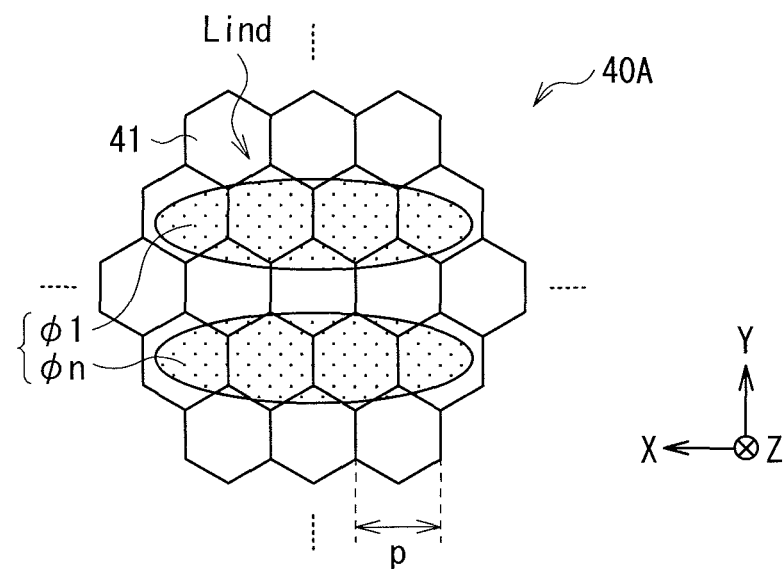

Moreover, at this time, the following expression (7) or the following expression (8) is preferably satisfied in relation to the above-described light flux size φkx and a pitch p (a minimum pitch) of a unit cell (a cell 41) in the integrator 40 (the fly-eye lens 40A). It is to be noted that, when the cell 41 has, for example, a rectangular shape, the pitch p of the cell 41 is determined, for example, as illustrated in FIG. 12A, and when the cell 41 has, for example, a hexagonal shape, the pitch p of the cell 41 is determined, for example, as illustrated in FIG. 12B. In the case where the expression (7) or (8) is satisfied in such a manner, a sufficient number of light fluxes superimposed on one another are secured in the integrator 40; therefore, an illumination image with high luminance uniformity is obtainable. Moreover, in particular, when the expression (8) is satisfied, luminance uniformity is further improved. It is to be noted that FIGS. 13A to 13C illustrate examples of the shape of the luminance distribution region Lind (in the case where the cell 41 has a rectangular shape) in the case of φkx>4.3p (FIG. 13A), φkx>2.3p (FIG. 13B), and φkx>1.6p (FIG. 13C). FIGS. 13A to 13C provides that as the light flux size φkx is relatively increased with respect to the pitch p of the cell 41, an effective number of light fluxes superimposed on one another in the integrator 40 is increased to improve luminance uniformity.

$$\phi kx > 2.3p \quad (7)$$

$$\phi kx > 4.3p \quad (8)$$

As described above, in the embodiment, in the solid-state light-emitting device 11 having the plurality of light-emitting spots 11B, the chip 11A includes an LD, and the coupling lenses 20A and 20B changing the directivity angle of light incident from the solid-state light-emitting device 11 are included; therefore, light use efficiency is improvable while achieving higher luminance of illumination light. Moreover, in the coupling lens 20A where laser light emitted from the solid-state light-emitting device 11 having the plurality of light-emitting spots 11B enters, the lens effect along the predetermined direction (the arrangement direction of the plurality of light-emitting spots 11B) is smaller than the lens effect along the direction orthogonal to the above-described predetermined direction in the light emission region; therefore, light use efficiency is improvable while achieving simplification (downsizing) of the configuration. Therefore, light use efficiency is improvable with a simple configuration while achieving higher luminance of illumination light, and display image quality is also improvable. In other words, a laser projector with higher luminance and lower power consumption capable of being mounted in a small and lightweight electronic apparatus is achievable.

Modifications

Next, modifications (Modifications 1 to 5) of the above-described embodiment will be described below. It is to be noted that like components are denoted by like numerals as of the embodiment and will not be further described.

Modification 1

Figure 14A:
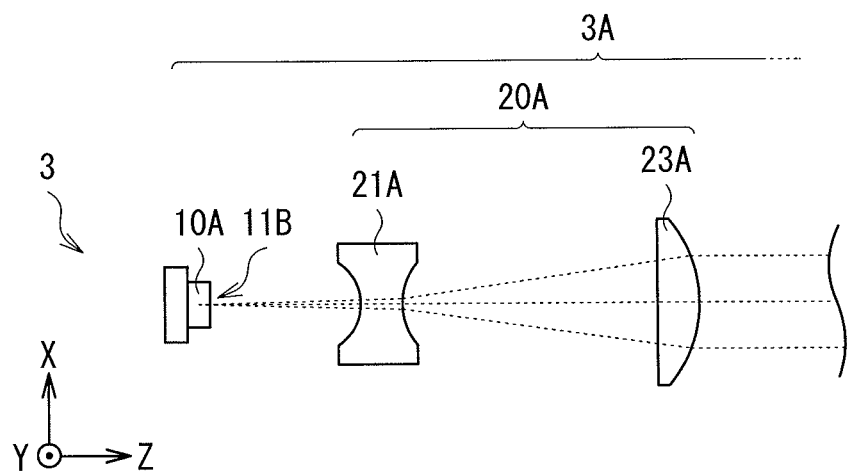
FIGS. 14A and 14B are diagrams illustrating an example of a schematic configuration of an illumination optical system and optical paths according to Modification 1.
Figure 14B:
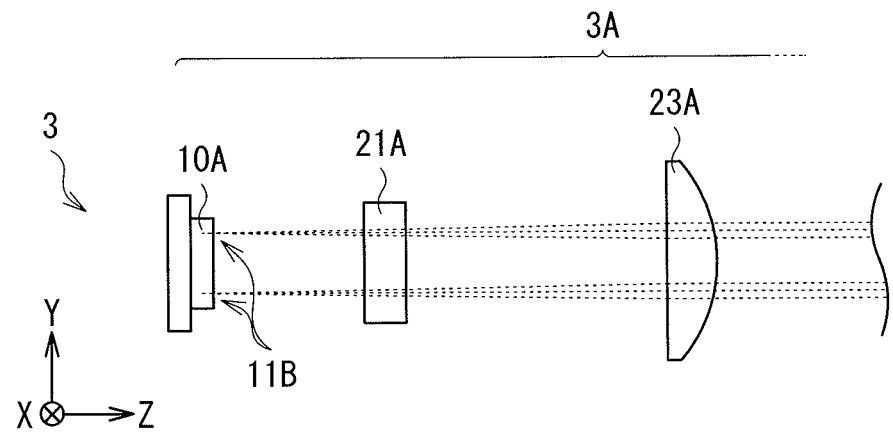

FIGS. 14A and 14B illustrate an example of a schematic configuration of a projector (a projector 3) and optical paths according to Modification 1. It is to be noted that the projector 3 corresponds to a specific example of "projection display unit" in an embodiment of the disclosure. FIG. 14A illustrates a configuration example of the projector 3 and an example of the optical paths when the projector 3 is viewed from above (from the y-axis direction), and FIG. 14B illustrates a configuration example of the projector 3 and an example of the optical paths when the projector 3 is viewed from a side thereof (from the x-axis direction).

The projector 3 according to the present modification is different from the projector 1 including the illumination optical system 1A in that the projector 3 includes an illumination optical system 3A. Description will be given of, mainly, points different from the projector 1, and points common to the projector 1 will not be further described. It is to be noted that the illumination optical system 3A corresponds to a specific example of "illumination unit" in an embodiment of the disclosure.

The illumination optical system 3A corresponds to the illumination optical system 1A in which the lens configuration of the coupling lens 20A is modified. More specifically, as with the coupling lens 20A in the illumination optical system 1A, the coupling lens 20A in the illumination optical system 3A includes one or more cylindrical lenses not having the lens effect along the arrangement direction (the y-axis direction) of the plurality of light-emitting spots. More specifically, in this case, the coupling lens 20A includes the cylindrical lens 21A which is located closer to the light source 10A (in a preceding stage) and is a concave lens and an anamorphic lens 23A which is located closer to the dichroic mirror 30A (in a following stage) and is a convex lens. In other words, the coupling lens 20A in the illumination optical system 3A has a configuration in which the anamorphic lens 23A is included instead of the cylindrical lens 22A in the coupling lens 20A of the illumination optical system 1A.

As described above, the cylindrical lens 21A is a lens having a function of expanding the diameter of incident laser light (the light flux diameter). On the other hand, as with the above-described cylindrical lens 22A, the anamorphic lens 23A is a lens having a function of converting laser light with a diameter expanded by the cylindrical lens 21A into a substantially parallel light beam in the plane (the z-x plane) orthogonal to the arrangement direction of the light-emitting spots 11B and then emitting the substantially parallel light beam. However, unlike the cylindrical lens 22A, for example, as illustrated in FIG. 14B, the anamorphic lens 23A has a slight lens effect along the arrangement direction (the y-axis direction) of the light-emitting spots 11B. However, in the entire coupling lens 20A, the lens effect along the arrangement direction (the y-axis direction) of the plurality of light-emitting spots 11B is smaller than the lens effect along the direction (the x-axis direction) orthogonal to the above-described predetermined direction in the light emission region. With such a configuration, the entire coupling lens 20A in the present modification also changes the directivity angle of incident laser light to convert the laser light into a substantially parallel light beam in the plane (the z-x plane) orthogonal to the arrangement direction of the light-emitting spots 11B and then to emit the substantially parallel light beam.

Also in the projector 3 according to the present modification including the coupling lens 20A with such a configuration, effects similar to those in the projector 1 according to the above-described embodiment are obtainable by functions similar to those in the projector 1.

Modification 2

FIGS. 15A and 15B illustrate an example of a schematic configuration of a projector (a projector 4) and optical paths according to Modification 2. It is to be noted that the projector 4 corresponds to a specific example of "projection display unit" in an embodiment of the disclosure. FIG. 15A illustrates a configuration example of the projector 4 and an example of the optical paths when the projector 4 is viewed from above (from the y-axis direction), and FIG. 15B illustrates a configuration example of the projector 4 and an example of the optical paths when the projector 4 is viewed from a side thereof (from the x-axis direction).

The projector 4 according to the present modification is different from the projector 1 including the illumination optical system 1A in that the projector 4 includes an illumination optical system 4A. Description will be given of, mainly, points different from the projector 1, and points common to the projector 1 will not be further described. It is to be noted that the illumination optical system 4A corresponds to a specific example of "illumination unit" in an embodiment of the disclosure.

The illumination optical system 4A corresponds to the illumination optical system 1A in which the lens configuration of the coupling lens 20A is modified. More specifically, as with the coupling lens 20A in the illumination optical system 1A, the coupling lens 20A in the illumination optical system 4A includes one or more cylindrical lenses not having the lens effect along the arrangement direction (the y-axis direction) of the plurality of light-emitting spots. More specifically, in this case, the coupling lens 20A includes a cylindrical lens 24A which is located closer to the light source 10A (in a preceding stage) and is a convex lens and the cylindrical lens 22A which is located closer to the dichroic mirror 30A (in a following stage) and is a convex lens. In other words, the coupling lens 20A in the illumination optical system 4A has a configuration in which the cylindrical lens 24A configured of a convex lens is included instead of the cylindrical lens 21A configured of a convex lens in the coupling lens 20A of the illumination optical system 1A, and the coupling lens 20A in the illumination optical system 4A uses two convex lenses.

As with the above-described cylindrical lens 21A, the cylindrical lens 24A is a lens having a function of expanding the diameter of incident laser light (the light flux diameter). With such a configuration, the entire coupling lens 20A in the present modification also changes the directivity angle of incident laser light to convert the laser light into a substantially parallel light beam in the plane (the z-x plane) orthogonal to the arrangement direction of the light-emitting spots 11B and then to emit the substantially parallel light beams. It is to be noted that, also in the entire coupling lens 20A in the present modification, the lens effect along the arrangement direction (the y-axis direction) of the plurality of light-emitting spots 11B is smaller than the lens effect along the direction (the x-axis direction) orthogonal to the above-described predetermined direction in the light emission region.

Also in the projector 4 according to the present modification including the coupling lens 20A with such a configuration, effects similar to those in the projector 1 according to the above-described embodiment are obtainable by functions similar to those in the projector 1.

Modification 3

Figure 16A:
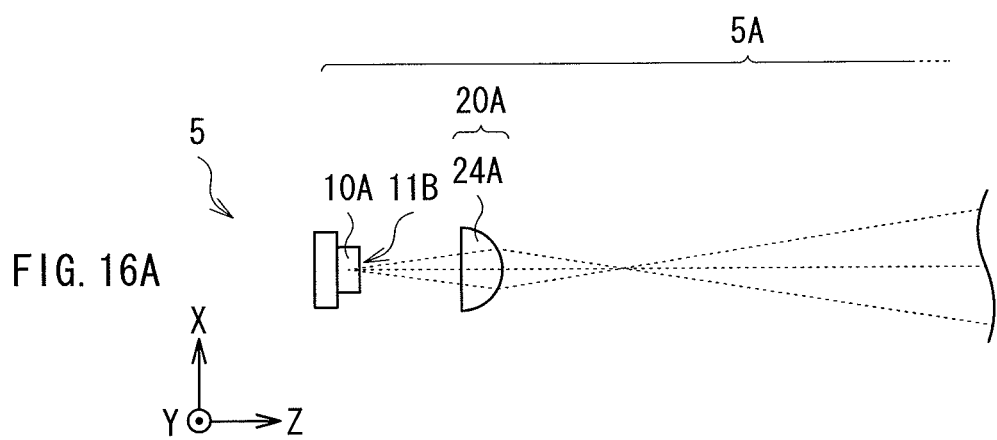
FIGS. 16A and 16B are diagrams illustrating an example of a schematic configuration of an illumination optical system and optical paths according to Modification 3.
Figure 16B:
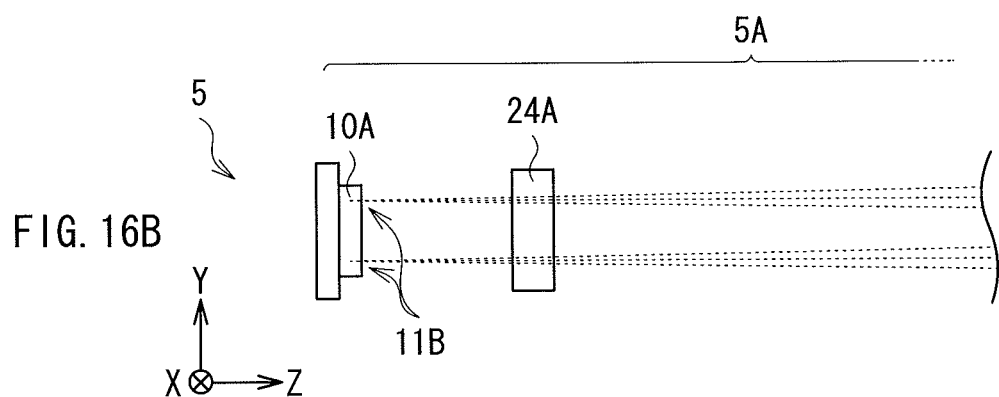

FIGS. 16A and 16B illustrate an example of a schematic configuration of a projector (a projector 5) and optical paths according to Modification 3. It is to be noted that the projector 5 corresponds to a specific example of "projection display unit" in an embodiment of the disclosure. FIG. 16A illustrates a configuration example of the projector 5 and an example of the optical paths when the projector 5 is viewed from above (from the y-axis direction), and FIG. 16B illustrates a configuration example of the projector 5 and an example of the optical paths when the projector 5 is viewed from a side thereof (from the x-axis direction).

The projector 5 according to the present modification is different from the projector 1 including the illumination optical system 1A in that the projector 5 includes an illumination optical system 5A. Description will be given of, mainly, points different from the projector 1, and points common to the projector 1 will not be further described. It is to be noted that the illumination optical system 5A corresponds to a specific example of "illumination unit" in an embodiment of the disclosure.

The illumination optical system 5A corresponds to the illumination optical system 1A in which the lens configuration of the coupling lens 20A is modified. More specifically, as with the coupling lens 20A in the illumination optical system 1A, the coupling lens 20A in the illumination optical system 5A includes one or more cylindrical lenses not having the lens effect along the arrangement direction (the y-axis direction) of the plurality of light-emitting spots. More specifically, in this case, the coupling lens 20A includes the cylindrical lens 24A which is a convex lens. In other words, the coupling lens 20A in the present modification has a configuration using only one cylindrical lens 24A which is a convex lens.

With such a configuration, unlike the above-described embodiment and Modifications 1 and 2, the present modification does not have a function of converting incident laser light into substantially parallel light (a function of changing a directivity angle). However, also in the entire coupling lens 20A in the present modification, the lens effect along the arrangement direction (the y-axis direction) of the plurality of light-emitting spots 11B is smaller than the lens effect along the direction (the x-axis direction) orthogonal to the above-described predetermine direction in the light emission region.

Also in the projector 5 according to the present modification including the coupling lens 20A with such a configuration, effects similar to those in the projector 1 according to the above-described embodiment are obtainable by functions similar to those in the projector 1.

Modification 4

Figures 17A, 17B:
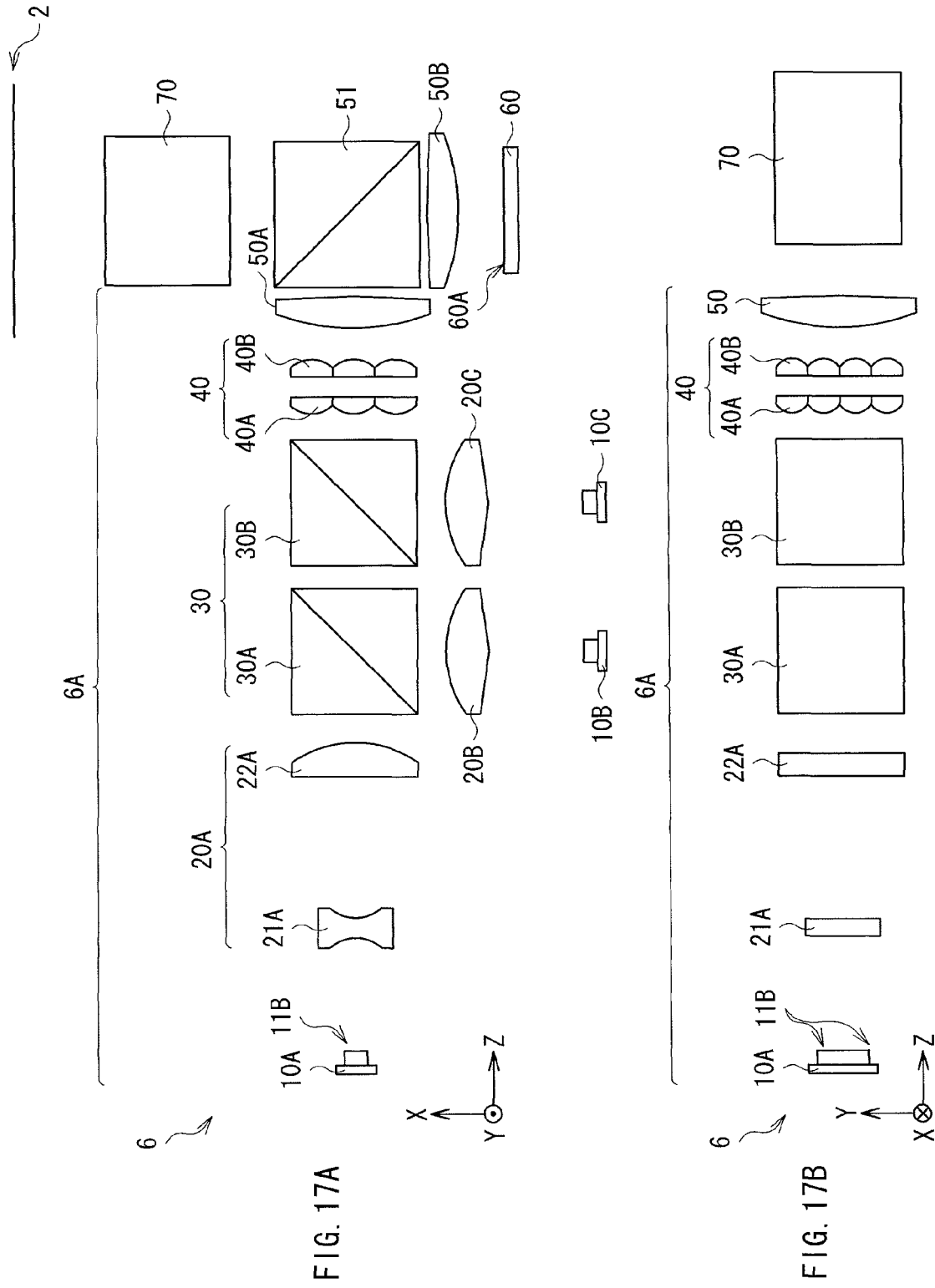
FIGS. 17A and 17B are diagrams illustrating a schematic configuration of a projector according to Modification 4.

FIGS. 17A and 17B illustrate an example of a schematic configuration of a projector (a projector 6) according to Modification 4. It is to be noted that the projector 6 corresponds to a specific example of "projection display unit" in an embodiment of the disclosure. FIG. 17A illustrates a configuration example of the projector 6 when viewed from above (from the y-axis direction), and FIG. 17B illustrates a configuration example of the projector 6 when viewed from a side thereof (from the x-axis direction).

The projector 6 according to the present modification is different from the projector 1 including the illumination optical system 1A in that the projector 6 includes an illumination optical system 6A and a reflective device is used as the spatial modulating device 60. Description will be given of, mainly, points different from the projector 1, and points common to the projector 1 will not be further described. It is to be noted that the illumination optical system 6A corresponds to a specific example of "illumination unit" in an embodiment of the disclosure.

The illumination optical system 6A corresponds to the illumination optical system 1A in which a condenser lens 50A is included instead of the condenser lens 50. The condenser lens 50A is a lens converting light fluxes, from light sources, formed by the integrator 40 into parallel light fluxes to illuminate a condenser lens 50B with the light fluxes through a polarizing beam splitter 51.

Moreover, in the present modification, as described above, the spatial modulating device 60 may be configured of, for example, a reflective device such as a reflective liquid crystal panel. Therefore, compared to the projector 1, the projector 6 further includes the condenser lens 50B and the polarizing beam splitter 51. The polarizing beam splitter 51 is an optical member selectively allowing specific polarized light (for example, p-polarized light) to pass therethrough and selectively reflecting the other polarized light (for example, s-polarized light). Moreover, the spatial modulating device 60 performs light modulation while reflecting light to allow light incident thereon and light exiting therefrom to have different polarization states (for example, s-polarization and p-polarization). Therefore, light incident from the illumination optical system 6A (for example, s-polarized light) is selectively reflected to enter the spatial modulating device 60, and image light (for example, p-polarized light) emitted from spatial modulating device 60 selectively passes through the spatial modulating device 60 to enter the projection optical system 70. The condenser lens 50B is a lens condensing light fluxes, from light sources, formed by the integrator 40 and being incident thereon through the condenser lens 50A and the polarizing beam splitter 51 to illuminate the illumination region 60A with the light fluxes in a superimposed manner.

Also in the projector 6 according to the present modification having such a configuration, effects similar to those in the projector 1 according to the above-described embodiment are obtainable by functions similar to those in the projector 1.

Modification 5

FIGS. 18A and 18B illustrate a schematic configuration of a projector (a projector 7) according to Modification 5. It is to be noted that the projector 7 corresponds to a specific example of "projection display unit" in an embodiment of the disclosure. FIG. 18A illustrates a configuration example of the projector 7 when viewed from above (from the y-axis direction), and FIG. 18B illustrates a configuration example of the projector 7 when viewed from a side thereof (from the x-axis direction).

The projector 7 according to the present modification is different from the projector 1 including the illumination optical system 1A in that the projector 7 includes an illumination optical system 7A. Description will be given of, mainly, points different from the projector 1, and points common to the projector 1 will not be further described. It is to be noted that the illumination optical system 7A corresponds to a specific example of "illumination unit" in an embodiment of the disclosure.

In the illumination optical system 7A, unlike the illumination optical system 1A (and the illumination optical systems 3A, 4A, 5A, and 6A) including a plurality of (three) light sources 10A, 10B, and 10C, only one light source 10A is included, and the dichroic mirrors 30A and 30B are not included. The light source 10A is disposed on an optical axis of the coupling lens 20A, and in the illumination optical system 7A, light emitted from the light source 10A directly enters the coupling lens 20A.

Also in the projector 7 according to the present modification in which only one light source 10A is included in the illumination optical system 1A, effects similar to those in the projector 1 according to the above-described embodiment are obtainable by functions similar to those in the projector 1.

Other Modifications

Although the technology of the present disclosure is described referring to the embodiments and the modifications, the technology is not limited thereto, and may be variously modified.

For example, in the above-described embodiment and the like, an example in which only the light source 10A of the light sources 10A, 10B, and 10C has a plurality of light-emitting spots 11B is described; however, the technology is not limited thereto, and the light sources 10B and 10C may have a plurality of light-emitting spots 11B in a manner similar to the light source 10A. In this case, when the coupling lenses 20B and 20C have a configuration similar to that of the coupling lens 20A described in the above-described embodiment and the like, similar effects are obtainable. Moreover, wavelengths of light emitted from the light sources 10A, 10B, and 10C may be arbitrarily replaced with one another. Further, all of the light sources 10A, 10B, and 10C may be contained in an integral package, and the integral package may have a configuration similar to that of the light source 10A. In this case, when the configuration of the coupling lens 20A described in the above-described embodiment and the like is adopted, similar effects are obtainable.

In the above-described embodiment and the like, each of the illumination optical systems 1A, 3A, 4A, 5A, 6A, and 7A includes an infinite optical system allowing parallel light to enter the fly-eye lens 40A; however, each of them may include a finite optical system allowing convergent light (or divergent light) to enter the fly-eye lens 40A. In this case, in the above-described embodiment and the like, instead of the coupling lenses 20A to 20C, coupling lenses (directivity angle change devices) having a function of converging (or diverging) light emitted from the light sources 10A to 10C may be provided.

A combination of any of configurations of characteristics parts in the respective illumination optical systems and the respective projectors described in the above-described embodiment and the like may be used. More specifically, a combination of the configuration of the illumination optical system 1A in the embodiment and any of the illumination optical systems 3A, 4A, 5A, 6A, and 7A in Modifications 1 to 5 may be used.

Figure 19:
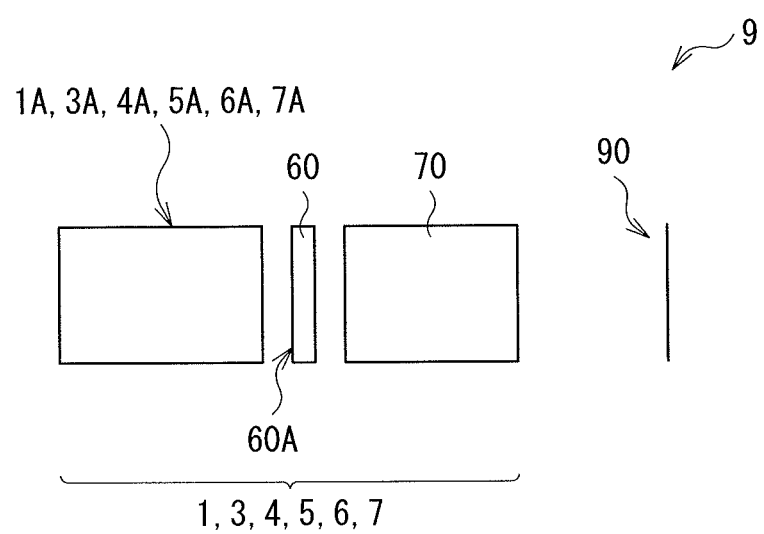
FIG. 19 is a diagram illustrating a schematic configuration example of a rear-projection display unit using any one of the illumination optical systems according to the embodiment and Modifications 1 to 5.

In the above-described embodiment and the like, a case where the technology is applied to the projection display unit is described; however, the technology is also applicable to any other display units. For example, as illustrated in FIG. 19, the technology is applicable to a rear-projection display unit 9 (a direct-view display unit). The rear-projection display unit 9 includes any of the projectors 1, 3, 4, 5, 6, 7, and the like including any of the illumination optical systems 1A, 3A, 4A, 5A, 6A, and 7A (or a combination of any of them) and a transmissive screen 90 displaying image light projected from the projector 1, 3, 4, 5, 6, 7, or the like (the projection optical system 70). When the illumination optical system 1A, 3A, 4A, 5A, 6A, 7A, or the like is used as an illumination optical system of the rear-projection display unit 9 in such a manner, light use efficiency is improvable with a simple configuration while achieving higher luminance of illumination light (image light or display light), and display image quality is improvable.

In the above-described embodiment and the like, a case where the spatial modulating device 60 is configured of a transmissive or reflective device is described as an example; however, the technology is not limited thereto. Alternatively, the spatial modulating device 60 may be configured of, for example, a digital micromirror device (DMD).

In the technology, in the solid-state light-emitting device 11 having a plurality of light-emitting spots 11B, the chip 11A may be configured of an SHG (Second Harmonic Generation) laser including an LD and an optical crystal (a wavelength conversion crystal).

In the above-described embodiment and the like, respective components (optical systems) of the illumination optical system and the display unit are specifically described; however, it is not necessary to include all of the components, or other components may be further included.

In the above-described embodiment and the like, a case where the illumination units in the embodiments and the like of the disclosure are applied to the projection display unit or the like is described as an example; however, the technology is not limited thereto, and the illumination unit is applicable to, for example, exposure systems such as steppers.

It is to be noted that the technology may have the following confirmations.

(1) An illumination unit including:
one or more light sources each including a solid-state light-emitting device, the solid-state light-emitting device emitting light from a light emission region thereof, the light emission region including a plurality of light-emitting spots arranged along a predetermined direction; and
an optical member allowing light incident from the solid-state light-emitting device to pass therethrough and exit therefrom,
in which the optical member includes one or more coupling lenses changing a directivity angle of the light incident from the solid-state light-emitting device,
the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another,
the single chip or the plurality of chips in the solid-state light-emitting device having the plurality of light-emitting spots each include a laser diode, and
a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

(2) The illumination unit according to (1), in which the first coupling lens includes one or more cylindrical lenses not having a lens effect along the predetermined direction.

(3) The illumination unit according to (2), in which the first coupling lens includes a first cylindrical lens and a second cylindrical lens, the first cylindrical lens and the second cylindrical lens being a concave lens and a convex lens, respectively.

(4) The illumination unit according to (3), in which
the first cylindrical lens expands a diameter of laser light incident thereon, and
the second cylindrical lens converts the laser light with a diameter expanded by the first cylindrical lens into a substantially parallel light beam in a plane orthogonal to the predetermined direction, and then emits the substantially parallel light beam.

(5) The illumination unit according to (2), in which the first coupling lens includes a cylindrical lens and an anamorphic lens, the cylindrical lens and the anamorphic lens being a concave lens and a convex lens, respectively.

(6) The illumination unit according to (2), in which the first coupling lens includes a plurality of cylindrical lenses which are convex lenses.

(7) The illumination unit according to any one of (2) to (6), in which the first coupling lens changes a directivity angle of incident laser light to convert the laser light into a substantially parallel light beam in a plane orthogonal to the predetermined direction, and then to emit the substantially parallel light beam.

(8) The illumination unit according to (2), in which the first coupling lens includes one cylindrical lens configured of a convex lens.

(9) The illumination unit according to any one of (1) to (8), in which the optical member includes the one or more coupling lenses, and an integrator uniformizing a luminance distribution in a predetermined illumination region illuminated with light having passed through the one or more coupling lenses.

(10) The illumination unit according to (9), in which a plurality of luminance distribution regions are separately formed along the predetermined direction on a light incident plane of the integrator by light fluxes incident from the one or more coupling lenses.

(11) The illumination unit according to (10), in which expressions [1] and [2] are satisfied in the integrator:

$$\phi x \geq \phi kx \qquad [1]$$

$$\phi y \geq (\phi ly/2)+(\phi ny/2)+d \qquad [2]$$

where $\phi x$ is an effective size of the integrator along the direction orthogonal to the predetermined direction on the light incident plane,
$\phi y$ is an effective size of the integrator along the predetermined direction on the light incident plane,
$\phi k$ is each of light fluxes forming the plurality of luminance distribution regions, where k=1, 2, ..., or n, and n is an integer of 2 or more,
$\phi kx$ is a light flux size along the direction orthogonal to the predetermined direction in the light flux $\phi k$,
$\phi ly$ is a light flux size along the predetermined direction in the light flux $\phi l$,
$\phi ny$ is a light flux size along the predetermined direction in the light flux $\phi n$, and
d is a distance between centers of the light fluxes $\phi l$ and $\phi n$ along the predetermined direction.

(12) The illumination unit according to (10) or (11), in which
the integrator includes one or more fly-eye lenses each including a plurality of unit cells on the light incident plane, and
an expression [3] is satisfied:

$$\phi kx > 2.3p \qquad [3]$$

where $\phi k$ is each of light fluxes forming the plurality of luminance distribution regions, where k=1, 2, ..., or n, and n is an integer of 2 or more,
$\phi kx$ is a light flux size along the direction orthogonal to the predetermined direction, and
p is a pitch of the unit cell.

(13) The illumination unit according to any one of (1) to (11), in which the light source is formed in a manner of a package incorporating the solid-state light-emitting device or a package in which the solid-state light-emitting device is supported on a base.

(14) The illumination unit according to any one of (1) to (12), in which the single chip or the plurality of chips in the solid-state light-emitting device having the plurality of light-emitting spots each includes a second harmonic generation (SHG) laser including the laser diode and an optical crystal.

(15) A projection display unit provided with an illumination optical system, a spatial modulating device, and a projection optical system, the spatial modulating device modulating light from the illumination optical system based on an input image signal to generate image light, the projection optical system projecting the image light generated by the spatial modulating device, the illumination optical system including:
one or more light sources each including a solid-state light-emitting device, the solid-state light-emitting device emitting light from a light emission region thereof, the light emission region including a plurality of light-emitting spots arranged along a predetermined direction; and
an optical member allowing light incident from the solid-state light-emitting device to pass therethrough and exit therefrom,
in which the optical member includes one or more coupling lenses changing a directivity angle of the light incident from the solid-state light-emitting device,
the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another,
the single chip or the plurality of chips in the solid-state light-emitting device having the plurality of light-emitting spots each include a laser diode, and
a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

(16) A direct-view display unit provided with an illumination optical system, a spatial modulating device, a projection optical system, and a transmissive screen, the spatial modulating device modulating light from the illumination optical system based on an input image signal to generate image light, the projection optical system projecting the image light generated by the spatial modulating device, the transmissive screen displaying the image light projected from the projection optical system, the illumination optical system including:
one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, in which the optical member includes one or more coupling lenses changing a directivity angle of the light incident from the solid-state light-emitting device, the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another, the single chip or the plurality of chips in the solid-state light-emitting device having the plurality of light-emitting spots each include a laser diode, and a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination unit comprising:
one or more light sources each including a solid-state light-emitting device, the solid-state light-emitting device emitting light from a light emission region thereof, the light emission region including a plurality of light-emitting spots arranged along a predetermined direction; and
an optical member allowing light incident from the solid-state light-emitting device to pass therethrough and exit therefrom,
wherein the optical member includes one or more coupling lenses changing a directivity angle of the light incident from the solid-state light-emitting device,
wherein the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another,
wherein the single chip or the plurality of chips in the solid-state light-emitting device having the plurality of light-emitting spots each include a laser diode,
wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident,
wherein the first coupling lens includes one or more cylindrical lenses not having a lens effect along the predetermined direction, and
wherein the first coupling lens includes a first cylindrical lens and a second cylindrical lens, the first cylindrical lens and the second cylindrical lens being a concave lens and a convex lens, respectively.

2. The illumination unit according to claim 1, wherein the first cylindrical lens is configured to expand a diameter of laser light incident thereon, and
the second cylindrical lens is configured to convert the laser light with a diameter expanded by the first cylindrical lens into a substantially parallel light beam in a plane orthogonal to the predetermined direction, and then emit the substantially parallel light beam.

3. The illumination unit according to claim 1, wherein the first coupling lens includes a cylindrical lens and an anamorphic lens, the cylindrical lens and the anamorphic lens being a concave lens and a convex lens, respectively.

4. The illumination unit according to claim 1, wherein the first coupling lens includes a plurality of cylindrical lenses which are convex lenses.

5. The illumination unit according to claim 1, wherein the first coupling lens changes a directivity angle of incident laser light to convert the laser light into a substantially parallel light beam in a plane orthogonal to the predetermined direction, and then to emit the substantially parallel light beam.

6. The illumination unit according to claim 1, wherein the first coupling lens includes one cylindrical lens including a convex lens.

7. The illumination unit according to claim 1, wherein the optical member includes the one or more coupling lenses, and an integrator uniformizing a luminance distribution in a predetermined illumination region illuminated with light having passed through the one or more coupling lenses.

8. The illumination unit according to claim 7, wherein a plurality of luminance distribution regions are separately formed along the predetermined direction on a light incident plane of the integrator by light fluxes incident from the one or more coupling lenses.

9. The illumination unit according to claim 8, wherein expressions (1) and (2) are satisfied in the integrator:

$$\phi x \geq \phi kx \quad (1)$$

$$\phi y \geq (\phi ly/2)+(\phi ny/2)+d \quad (2)$$

where $\phi x$ is an effective size of the integrator along the direction orthogonal to the predetermined direction on the light incident plane,
$\phi y$ is an effective size of the integrator along the predetermined direction on the light incident plane,
$\phi k$ is each of light fluxes forming the plurality of luminance distribution regions, where $k=1, 2, \ldots,$ or $n$, and $n$ is an integer of 2 or more,
$\phi kx$ is a light flux size along the direction orthogonal to the predetermined direction in the light flux $\phi k$,
$\phi ly$ is a light flux size along the predetermined direction in the light flux $\phi l$,
$\phi ny$ is a light flux size along the predetermined direction in the light flux $\phi n$, and
$d$ is a distance between centers of the light fluxes $\phi l$ and $\phi n$ along the predetermined direction.

10. The illumination unit according to claim 8, wherein the integrator includes one or more fly-eye lenses each including a plurality of unit cells on the light incident plane, and
an expression (3) is satisfied:

$$\phi kx > 2.3p \quad (3)$$

where $\phi k$ is each of light fluxes forming the plurality of luminance distribution regions, where $k=1, 2, \ldots,$ or $n$, and $n$ is an integer of 2 or more,
$\phi kx$ is a light flux size along the direction orthogonal to the predetermined direction, and
$p$ is a pitch of the unit cell.

11. The illumination unit according to claim 1, wherein the light source is formed in a manner of a package incorporating the solid-state light-emitting device or a package in which the solid-state light-emitting device is supported on a base.

12. The illumination unit according to claim 1, wherein the single chip or the plurality of chips in the solid-state light-emitting device having the plurality of light-emitting spots each includes a second harmonic generation (SHG) laser including the laser diode and an optical crystal.

13. A projection display unit including an illumination optical system, a spatial modulating device, and a projection optical system, the spatial modulating device modulating light from the illumination optical system based on an input image signal to generate image light, the projection optical system projecting the image light generated by the spatial modulating device, the illumination optical system comprising:
   one or more light sources each including a solid-state light-emitting device, the solid-state light-emitting device emitting light from a light emission region thereof, the light emission region including a plurality of light-emitting spots arranged along a predetermined direction; and
   an optical member allowing light incident from the solid-state light-emitting device to pass therethrough and exit therefrom,
   wherein the optical member includes one or more coupling lenses changing a directivity angle of the light incident from the solid-state light-emitting device,
   wherein the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another,
   wherein the single chip or the plurality of chips in the solid-state light-emitting device having the plurality of light-emitting spots each include a laser diode,
   wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident,
   wherein the first coupling lens includes one or more cylindrical lenses not having a lens effect along the predetermined direction, and
   wherein the first coupling lens includes a first cylindrical lens and a second cylindrical lens, the first cylindrical lens and the second cylindrical lens being a concave lens and a convex lens, respectively.

14. A direct-view display unit including an illumination optical system, a spatial modulating device, a projection optical system, and a transmissive screen, the spatial modulating device modulating light from the illumination optical system based on an input image signal to generate image light, the projection optical system projecting the image light generated by the spatial modulating device, the transmissive screen displaying the image light projected from the projection optical system, the illumination optical system comprising:
   one or more light sources each including a solid-state light-emitting device, the solid-state light-emitting device emitting light from a light emission region thereof, the light emission region including a plurality of light-emitting spots arranged along a predetermined direction; and
   an optical member allowing light incident from the solid-state light-emitting device to pass therethrough and exit therefrom,
   wherein the optical member includes one or more coupling lenses changing a directivity angle of the light incident from the solid-state light-emitting device,
   wherein the solid-state light-emitting device includes a single chip or a plurality of chips, the single chip emitting light in a single wavelength range or light in a plurality of wavelength ranges, the plurality of chips emitting light in a same wavelength range or light in wavelength ranges different from one another,
   wherein the single chip or the plurality of chips in the solid-state light-emitting device having the plurality of light-emitting spots each include a laser diode,
   wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident,
   wherein the first coupling lens includes one or more cylindrical lenses not having a lens effect along the predetermined direction, and
   wherein the first coupling lens includes a first cylindrical lens and a second cylindrical lens, the first cylindrical lens and the second cylindrical lens being a concave lens and a convex lens, respectively.

15. An illumination unit comprising:
   one or more light sources each including a solid-state light-emitting device, the solid-state light-emitting device emitting light from a light emission region thereof, the light emission region including a plurality of light-emitting spots arranged along a predetermined direction; and
   an optical member allowing light incident from the solid-state light-emitting device to pass therethrough and exit therefrom,
   wherein the optical member includes one or more coupling lenses changing a directivity angle of the light incident from the solid-state light-emitting device,
   wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident,
   wherein the first coupling lens includes one or more cylindrical lenses not having a lens effect along the predetermined direction, and
   wherein the first coupling lens includes a cylindrical lens and an anamorphic lens, the cylindrical lens and the anamorphic lens being a concave lens and a convex lens, respectively.

16. An illumination unit comprising:
   one or more light sources each including a solid-state light-emitting device, the solid-state light-emitting device emitting light from a light emission region thereof, the light emission region including a plurality of light-emitting spots arranged along a predetermined direction; and
   an optical member allowing light incident from the solid-state light-emitting device to pass therethrough and exit therefrom,
   wherein the optical member includes one or more coupling lenses changing a directivity angle of the light incident from the solid-state light-emitting device, wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident, wherein the first coupling lens includes one or more cylindrical lenses not having a lens effect along the predetermined direction, and wherein the first coupling lens includes a first cylindrical lens and a second cylindrical lens, the first cylindrical lens and the second cylindrical lens being a concave lens and a convex lens, respectively.

17. A projection display unit including an illumination optical system, a spatial modulating device, and a projection optical system, the spatial modulating device modulating light from the illumination optical system based on an input image signal to generate image light, the projection optical system projecting the image light generated by the spatial modulating device, the illumination optical system comprising:

one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, wherein the optical member includes one or more coupling lenses changing a directivity angle of the light incident from the solid-state light-emitting device, wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident, wherein the first coupling lens includes one or more cylindrical lenses not having a lens effect along the predetermined direction, and wherein the first coupling lens includes a cylindrical lens and an anamorphic lens, the cylindrical lens and the anamorphic lens being a concave lens and a convex lens, respectively.

18. A direct-view display unit including an illumination optical system, a spatial modulating device, a projection optical system, and a transmissive screen, the spatial modulating device modulating light from the illumination optical system based on an input image signal to generate image light, the projection optical system projecting the image light generated by the spatial modulating device, the transmissive screen displaying the image light projected from the projection optical system, the illumination optical system comprising:

one or more light sources each including a solid-state light-emitting device, the solid-state light-emitting device emitting light from a light emission region thereof, the light emission region including a plurality of light-emitting spots arranged along a predetermined direction; and an optical member allowing light incident from the solid-state light-emitting device to pass therethrough and exit therefrom, wherein the optical member includes one or more coupling lenses changing a directivity angle of the light incident from the solid-state light-emitting device, wherein a first coupling lens of the one or more coupling lenses has a smaller lens effect along the predetermined direction than a lens effect along a direction orthogonal to the predetermined direction in the light emission region, the first coupling lens on which laser light emitted from the solid-state light-emitting device having the plurality of light-emitting spots is incident, wherein the first coupling lens includes one or more cylindrical lenses not having a lens effect along the predetermined direction, and wherein the first coupling lens includes a cylindrical lens and an anamorphic lens, the cylindrical lens and the anamorphic lens being a concave lens and a convex lens, respectively.

* * * * *